US008761050B2

(12) United States Patent
Lu et al.

(10) Patent No.: US 8,761,050 B2
(45) Date of Patent: Jun. 24, 2014

(54) NETWORK INTEGRATION SYSTEM AND METHOD

(71) Applicant: Advanergy, Inc., Winnetka, CA (US)

(72) Inventors: Jin Lu, Oak Park, CA (US); Todd Scott Kelly, Winnetka, CA (US)

(73) Assignee: Advanergy, Inc., Winnetka, CA (US)

( * ) Notice: Subject to any disclaimer, the term of this patent is extended or adjusted under 35 U.S.C. 154(b) by 70 days.

(21) Appl. No.: 13/645,044

(22) Filed: Oct. 4, 2012

(65) Prior Publication Data
US 2013/0083805 A1 Apr. 4, 2013

Related U.S. Application Data

(60) Provisional application No. 61/698,288, filed on Sep. 7, 2012, provisional application No. 61/667,477, filed on Jul. 3, 2012, provisional application No. 61/661,100, filed on Jun. 18, 2012, provisional application No. 61/655,099, filed on Jun. 4, 2012, provisional application No. 61/542,811, filed on Oct. 4, 2011.

(51) Int. Cl.
H04L 12/28 (2006.01)
(52) U.S. Cl.
CPC ......... *H04L 12/2807* (2013.01); *H04L 12/2816* (2013.01); *H04L 12/2823* (2013.01); *H04L 12/283* (2013.01)
USPC ............ 370/254; 370/401; 709/237; 709/249
(58) Field of Classification Search
None
See application file for complete search history.

(56) References Cited

U.S. PATENT DOCUMENTS 7,986,718 B2 * 7/2011 Monier .......................... 370/509
(Continued)

FOREIGN PATENT DOCUMENTS

KR 1020080095645 A 10/2008
WO 2011087164 A1 7/2011

OTHER PUBLICATIONS (Author Unknown); "Battery Life (and Death)"; Electropaedia: At least as early as Oct. 4, 2011; http://www.mpoweruk.com/life.htm; 8 pp.

(Continued)

*Primary Examiner* — Timothy J Weidner
(74) *Attorney, Agent, or Firm* — David W. Carstens; Kevin M. Klughart; Carstens & Cahoon, LLP

(57) ABSTRACT

A network integration system/method allowing computer network functionality in a coordinated/concerted fashion in network configurations that are local to and/or spanning network gateway routers is disclosed. The system utilizes a Smart Gateway Power Controller (SGPC) to interact within a home automation network (HAN) to permit the local HAN to operate as a distinct network but still permit access to/from remote networks such as the Internet. The system permits inter-networking of HAN devices (including SGPCs) and device interaction as a group with consumers within a man-machine "social network," where information is pushed/pulled just as with a conventional social network. The system/method allows HAN device setup/action/monitoring wherein HAN devices host a number of user interfaces supported locally and externally to web interfaces/networks, these interfaces supporting local/remote access devices including mobile phones, tablet computers, laptops, desktop computers, and the like.

20 Claims, 32 Drawing Sheets

(56) References Cited

U.S. PATENT DOCUMENTS

| | | | | |
|---|---|---|---|---|
| 8,086,702 B2* | 12/2011 | Baum et al. | | 709/220 |
| 8,086,757 B2* | 12/2011 | Chang | | 709/246 |
| 8,209,400 B2* | 6/2012 | Baum et al. | | 709/218 |
| 8,331,544 B2* | 12/2012 | Kraus et al. | | 709/249 |
| 2002/0046083 A1* | 4/2002 | Ondeck | | 705/14 |
| 2002/0130652 A1 | 9/2002 | Bessler | | |
| 2002/0156899 A1* | 10/2002 | Sekiguchi | | 709/227 |
| 2004/0215750 A1* | 10/2004 | Stilp | | 709/220 |
| 2005/0057223 A1 | 3/2005 | Harada | | |
| 2005/0172056 A1* | 8/2005 | Ahn | | 710/72 |
| 2006/0123053 A1* | 6/2006 | Scannell | | 707/104.1 |
| 2006/0259184 A1 | 11/2006 | Hayes et al. | | |
| 2007/0097993 A1* | 5/2007 | Bojahra et al. | | 370/401 |
| 2007/0112939 A1 | 5/2007 | Wilson et al. | | |
| 2008/0255692 A1 | 10/2008 | Hofrichter et al. | | |
| 2008/0288618 A1 | 11/2008 | Vardi et al. | | |
| 2009/0100176 A1* | 4/2009 | Hicks et al. | | 709/224 |
| 2009/0147696 A1 | 6/2009 | Park et al. | | |
| 2009/0150925 A1* | 6/2009 | Henderson | | 725/34 |
| 2009/0224603 A1 | 9/2009 | Perper et al. | | |
| 2010/0037071 A1* | 2/2010 | Chang | | 713/310 |
| 2010/0070217 A1 | 3/2010 | Shimada et al. | | |
| 2010/0138092 A1 | 6/2010 | Kohn | | |
| 2010/0188046 A1 | 7/2010 | Liu et al. | | |
| 2010/0217837 A1* | 8/2010 | Ansari et al. | | 709/218 |
| 2010/0238003 A1 | 9/2010 | Chan et al. | | |
| 2010/0305773 A1 | 12/2010 | Cohen | | |
| 2010/0312851 A1* | 12/2010 | Jackson et al. | | 709/217 |
| 2010/0332164 A1 | 12/2010 | Aisa et al. | | |
| 2011/0106279 A1* | 5/2011 | Cho et al. | | 700/90 |
| 2011/0202293 A1 | 8/2011 | Kobraei et al. | | |
| 2011/0202910 A1* | 8/2011 | Venkatakrishnan et al. | | 709/236 |
| 2011/0320636 A1* | 12/2011 | Young et al. | | 709/249 |
| 2012/0223840 A1* | 9/2012 | Guymon et al. | | 340/870.02 |
| 2013/0073705 A1* | 3/2013 | Hester | | 709/223 |
| 2013/0083805 A1* | 4/2013 | Lu et al. | | 370/401 |
| 2013/0113993 A1* | 5/2013 | Dagit, III | | 348/552 |
| 2013/0159490 A1* | 6/2013 | Huh et al. | | 709/223 |
| 2013/0345884 A1* | 12/2013 | Forbes, Jr. | | 700/286 |

OTHER PUBLICATIONS (Author Unknown); "Charging Lithium-ion"; Battery University; At least as early as Nov. 10, 2010; http://batteryuniversity.com/index.php/learn/article/charging_lithium_ion_batteries; 32 pp.

(Author Unknown); "Battery Management System (BMS)"; Electropaedia; At least as early as Oct. 4, 2011; http://www.mpoweruk.com/bms.htm#smartbats (smart battery); 8 pp.

(Author Unknown); "How to Prolong Lithium-based Batteries"; Battery University; At least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.

(Author Unknown); "How to Enable/Disable Battery Care Function on Sony Vaio to improve Battery Life"; Digital Pbk (Forum); At least as early as Aug. 12, 2011; http://digitalpbk.com/hardware/sony-vaio-enable-battery-care-function-improve-battery-life; 4 pp.

(Author Unknown); "Wi-Fi Light Control"; Wi-Fi Planet (Forum); Jan. 31, 2009; http://forums.wi-fiplanet.com/showthread.php?t=9954, 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

(Author Unknown); "Simplest Possible WiFi Remote Power Switch"; AVS (Forum); Sep. 15, 2011; http://www.avsforum.com/avs-vb/showthread.php?p=20977417; 5 pp.

(Author Unknown); "A Wi-Fi Controlled Power Outlet From iPhone?"; Yahoo Answers: Apr. 1, 2011; http://answers.yahoo.com/question/index?qid=20110401143408AAPQerm; 2 pp.

(Author Unknown); "Control Home Lights Via Internet With Your Computer or Wi-Fi Handheld Devices"; Squidoo; At least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; At least as early as Oct. 3, 2012; http://www.simplehomenet.com/proddetail.asp!prod=HarmonyGateway; 1 p.

\* cited by examiner

NETWORK INTEGRATION SYSTEM AND METHOD

CROSS REFERENCE TO RELATED APPLICATIONS

This application claims benefit under 35 U.S.C. §119 and incorporates by reference U.S. Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288.

This application claims benefit under 35 U.S.C. §119 and incorporates by reference U.S. Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477. This document will be referred to herein as "Document NISM."

This application claims benefit under 35 U.S.C. §119 and incorporates by reference U.S. Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100. This document will be referred to herein as "Document PCSM."

This application claims benefit under 35 U.S.C. §119 and incorporates by reference U.S. Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099.

This application claims benefit under 35 U.S.C. §119 and incorporates by reference U.S. Provisional Patent Application for SMART BATTERY CONTROLLER by inventor Jin (nmn) Lu, filed electronically with the USPTO on Oct. 4, 2011, with Ser. No. 61/542,811.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods that control or switch power to a variety of electrical devices. Specifically, the present invention in many preferred embodiments has application to home/commercial network integration automation systems in which electrical power to appliances and other electrical loads is controlled via commands received from a local or remote computer network.

In many preferred embodiments the present invention allows electrical loads to be controlled locally or remotely via an Internet-capable device (e.g., a smartphone, a tablet, or laptop) and provides a non-intrusive, secure, and blended load control interface that is compatible with home and commercial computer networks.

Within this context the present invention permits integration of computer networks to allow functionality in a coordinated/concerted fashion in network configurations that are local to and/or spanning network gateway routers.

PRIOR ART AND BACKGROUND OF THE INVENTION

Background

There is a high demand in home automation/home energy control market for an easy to use home automation device—a wirelessly and remotely controlled AC power switch that can turn on and off AC power supply to consumer electronic devices and measure the energy consumption of the consumer electric loads. This demand is obvious in numerous consumer forums and is widely discussed in the prior art.

Such a home automation device can be configured to automatically turn on and off a consumer device at a chosen time and on certain conditions. In addition, the device measures the energy consumption and uses that information for energy usage planning and "smart" switching of the electronic device. This improves the quality of life as well as reducing energy consumption.

A home automation device that can remotely switch on and off AC power switch is not new. The prior art teaches power line based AC switches by which the control command is send over the power line and wireless AC switches where the control command is sent over a wireless link. These home automation devices can be categorized into two groups:

Non-Internet based home automation devices. A remote controller is required to send the control command to the devices over a communication protocol not compatible with Internet. Consumers cannot control them from anywhere. Examples are ZIGBEE® and Z-WAVE® based devices.

Internet based home automation devices. These devices can be accessed with Internet capable equipment, such as a smartphone or a laptop. Existing Internet based home automation devices, however, suffer the following drawbacks:

Consumers cannot easily access the devices both at home and away from home.

Consumers have to log on to a service provider's website while away from home, and from there read the data and control the automation device. Consumers cannot communicate with the device directly. This presents some security issues as well as performance issues.

This type of devices is usually intrusive to existing home network as consumers either need to get a new home gateway to work with the automation device, or add a new router or hub to the home network to "relay" the signals.

Home Automation Networking

Most homes today have the last mile communication connection (e.g., a cable link, a fiber optic or a telephone line).

Inside a home there is a gateway device that terminates the last mile network and routes the signal between the consumer devices at home and the network outside home. The communication of the gateway with the home devices can be wireline or wireless. Wireline communication includes power line, cable, and Ethernet. But predominantly, the communication trend is wireless based on WiFi. The communication of the home gateway with home devices forms home network. In this document, it will be assumed that the home gateway is a WiFi AP and that the home network is a WiFi home network.

Existing home energy management system or a home automation system is a system that has a two-way communication with a service provider (e.g., a utility company or a security company) that monitors the home power consumption and exerts control such as switching on and off a device.

The challenges these systems encounter in their home deployment are:

Service Provider Centric vs. Consumer Centric—The service providers have the control, with consumers permission, over when and what data to collect and when and what device to control. This is a service provider centric approach. There are privacy issues and the issues of consumer's ability to access the data. For example, when a consumer is at home, must he/she login to a service provider's site to look at data and exercise control or can he/she easily access the information and exercise control directly from/to the automation devices at the home, from a laptop or a smartphone. Today's deployed automation and energy management system requires the consumer to remotely login to a service provider site for information and provides no method for easy and direct access to or control over the device.

Network Issues—When an automation device is deployed at home, it either has to work with existing home residential gateway (the AP) or replace the existing home gateway with a new home gateway that knows how to communicate with the automation device. With ZIGBEE® as part of the many automation/energy management system, it is frequently the case that a new home gateway must be used in place of the existing one. This "intrusive" setup that often requires professional setup forces consumers to make changes in their home network setup. In addition, once the energy management network is deployed at a home, it is not easy to deploy additional energy management devices from other vendors.

Performance—As mentioned above, many existing home energy systems do not allow consumers to access or control them DIRECTLY via a smartphone or a tablet, even if they are proximal to the energy system. Instead the consumer must either have to use a dedicated device like a remote control or have to go to a service provider's website to exercise control. It involves sending signals to the home gateway, to an Internet server, and back to the home gateway and back to the consumer's automation device. As a result, it introduces delays (sometimes significant delays) depending on the overall network traffic.

Deficiencies in the Prior Art

The prior art as detailed above suffers from the following deficiencies:

Prior art network integration systems generally do not permit integration of disparate types of home automation networks.

Prior art network integration systems generally do not interface well with the Internet and rely on proprietary interface protocols operating within a locally defined network interface to affect network integration functions.

Prior art network integration systems generally do not permit "nesting" or "subnetting" of control networks to define hierarchical control domains that can be accessed remotely via the Internet or some other network interface.

Prior art network integration systems do not allow coordinated/concerted network functionality in networks that are local to and/or span network gateway routers.

Prior art network integration systems do not permit interaction within a home automation network to permit creation of "social networks" within the home automation framework.

Prior art network integration systems do not permit advertising to be linked with the status of the home automation network.

While some of the prior art may teach some solutions to several of these problems, the core issue of integrating disparate home automation networks with Internet based communication control systems has not been solved by the prior art.

Objectives of the Invention

Accordingly, the objectives of the present invention are (among others) to circumvent the deficiencies in the prior art and affect the following objectives in the context of a Smart Gateway Power Controller (SGPC):

(1) Provide for a network integration system and method that permits formation of home automation networks with a set of subnets.

(2) Provide for a network integration system and method that permits multiple ways to interact with a home automation network.

(3) Provide for a network integration system and method that permits users to interact with any home automation device by connecting thru a SGPC device.

(4) Provide for a network integration system and method that permits a method to provide web banners integrated with the interaction with home automation devices.

(5) Provide for a network integration system and method that permits a mechanism to see the network view of the home automation devices.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0100)

The present invention in various embodiments addresses one or more of the above objectives in the following manner. The present invention as generally depicted in FIG. 1 (0100) implements a Smart Gateway Power Controller (SGPC) (0110) that acts as a bridge between a power source (0101) and associated power source cabling (0102) and power load cabling (0103) to supply power to one or more electrical loads (0104). The SGPC (0110) incorporates a power switch (0111) and power/energy meter (0112) that are interfaced to a microcontroller unit (MCU) (0113) or other computing device operating under control of software read from a computer readable medium (0114). The MCU (0113) interfaces with one or more wireless network interface modules (0115, 0116) which communicate to one or more computer networks that may include the WiFi-based Internet, local computer networks, and/or other networks such as ZIGBEE®, etc.

System Application Context (0200)

A typical application context for the present invention is generally illustrated in FIG. 2 (0200), wherein a user (0201) interfaces with a graphical user interface (GUI) (0210) that may be embodied on any number of devices including but not limited to a mobile phone (0211), laptop/desktop computer (0212), and/or tablet computer (0213). This GUI typically operates under control of software read from a computer readable medium (0202) that incorporates network protocols that communicate over a computer network (0203) (such as the Internet) directly to the SGPC devices (in this case SGPCs are APs) or indirectly to the SGPC devices via a local wireless router (0204). This wireless router (0204) then communicates with one or more SGPC devices (0221, 0222, 0223) to control power switching to any number of load devices (0231, 0232, 0233, 0234) using any number of SGPC associated power receptacles. In the direct communication with a SGPC, the SGPC acts as an AP to consumer devices and at the same time may act as a client to a home gateway (0204). In the case of indirect communication, the SGPC is a client to the home gateway (while also acting as an AP to other devices). The dual roles are illustrated in FIG. 3 (0300). FIG. 4 (0400)-FIG. 7 (0700) illustrate the direct and indirect communications between consumer devices and SGPCs. As generally illustrated in these figures, the SGPC may be configured to directly communicate with other SGPCs in a HAN, and/or be configured to indirectly communicate via a home gateway router (0204). As generally illustrated in FIG. 4 (0400), consumer devices can directly communicate with SGPCs without going through a home gateway. In this instance, the SGPC is an AP to the consumer device and simultaneously a client to a home gateway.

Method Overview

The present invention system may be utilized in the context of an overall network integration method, wherein the network integration system described previously is controlled by a method having the following steps:
(1) Searching for an AP to connect/reconnect. After SGPC power up, searching and connecting to an AP based on a connection rule, with options to connect to other Aps if the network configuration changes (self-adaptivity)).
(2) Exchanging network configuration messages between SGPCs and/or external network devices (network maintenance messages).
(3) Exchanging runtime (maintenance) HA messages between SGPCs and/or external network devices (home automation functionality messages).
(4) Proceeding to step (1).
Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
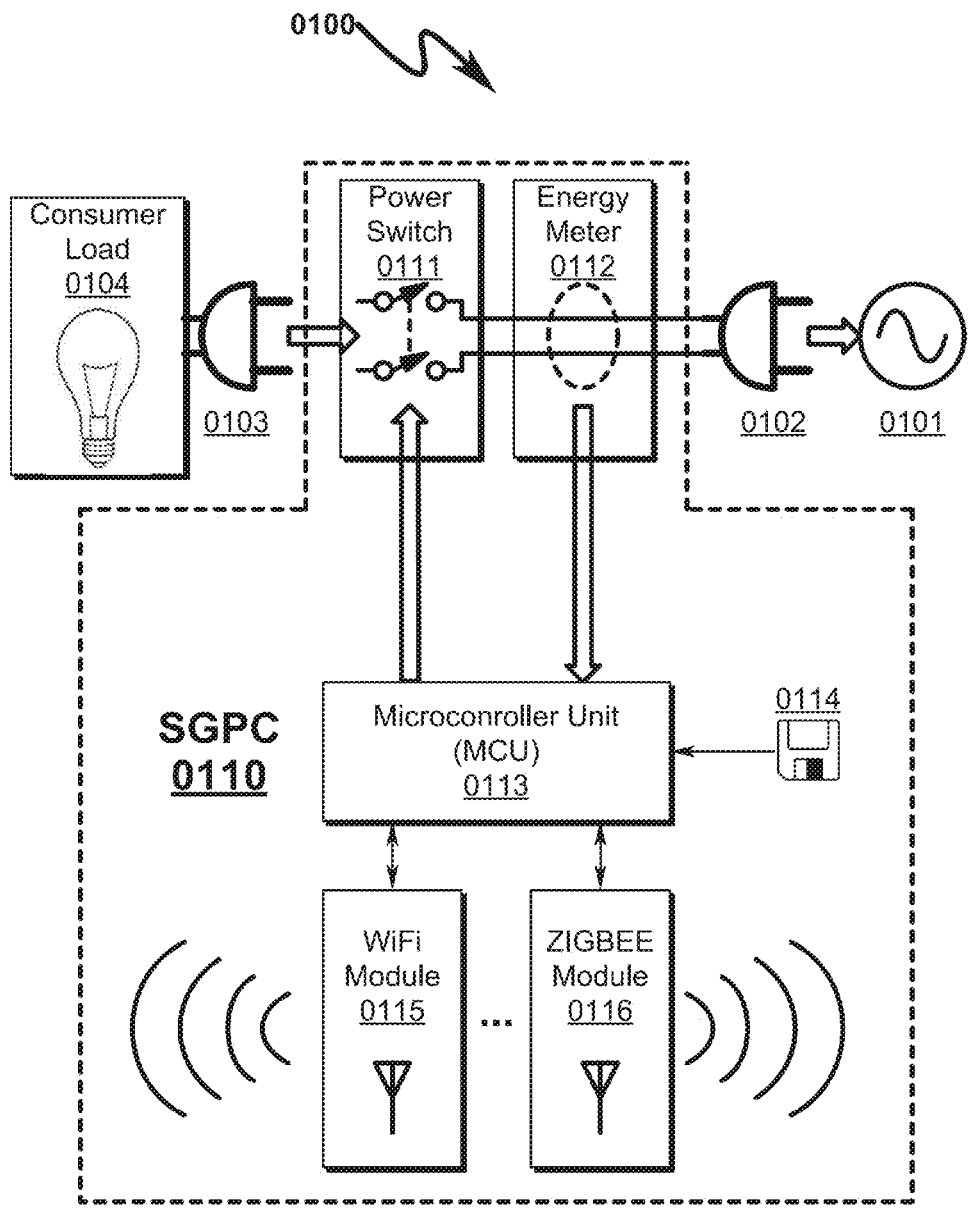
FIG. 1 illustrates a system block overview diagram describing a presently preferred embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a NETWORK INTEGRATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Automation Not Limitive

The terms automation, energy control, and energy management are used interchangeably within the context of the present invention.

Computing Device Not Limitive

The present invention may make use of a wide variety of computing devices in its general theme of construction. While microcontroller unit (MCU) construction may be optimal in many circumstances, the present invention is not limited to this particular form of construction and the term "computing device" and "MCU" should be given their broadest possible definitions in this context.

Portable Computing Device Not Limitive

The present invention anticipates a wide variety of applications for the network integration system/method taught herein. Within the application context, the term "portable computing device" and its variants should be given its broadest possible interpretation, to include but not limited to laptop computers, cellphones, tablet computers, and other like and typical applications where computing devices are configured in a portable or semi-portable manner. While the present invention anticipates that the computational capability of the "computing device" described herein may vary widely, it is anticipated that some aspects of the present invention may be implemented using software embodied in computer readable program code means embodied on a tangible medium that is computer readable.

Invention Nomenclature

The following nomenclature is generally utilized to describe the invention herein:

Home Area Network (HAN) or Home Network—A residential or commercial local area network (LAN) for communication between digital devices typically deployed in the home, usually desktop computers and accessories, such as printers and mobile computing devices.

Home Gateway—A home networking device, used as a gateway (router) to connect devices in the home to the Internet.

Subnetwork or Subnet—A logically visible subdivision of an IP network. The practice of dividing a single network into two or more networks is called subnetting and the networks created are called subnetworks or subnets.

Sub-Gateway—A gateway which itself is a device in the main HAN, but is a gateway to a subnet separate from the main HAN.

WiFi—A popular technology that allows an electronic device to exchange data wirelessly (using radio waves) over a computer network, including high-speed Internet connections.

WiFi Access Point or AP—A device that allows WiFi stations (clients) to connect to each other, the AP and a wired network. An AP usually connects to a router (via a wired network), and can relay data between the wireless devices (such as computers or printers) and wired devices on the network.

WiFi Station or STA—A device that has the capability to use the 802.11 protocol. For example, a station may be a laptop, a desktop PC, PDA, Wi-Fi phone. A STA may be fixed, mobile or portable. The terms station, wireless client, and node are often used interchangeably, and no strict distinction exists between these terms.

ZIGBEE®—A specification for a suite of high level communication protocols using small, low-power digital radios based on an IEEE 802 standard for personal area networks.

Home Automation—Automation of the home, housework or household activity. Home automation may include centralized control of lighting, HVAC (heating, ventilation and air conditioning), appliances, and other systems, to provide improved convenience, comfort, energy efficiency, and security.

Home Energy Management System—An extension of EMS into home, where a smart thermostat, a smart meter and a few load control switches are installed and can be remotely accessed (read) and controlled.

IP Address—A numerical label (e.g., 10.10.100.254) assigned to each device (e.g., computer, printer) participating in a computer network that uses the Internet Protocol for communication.

Port—Associated with an IP address of the host, identifying an application or a server on the host.

Port Number—A 16-bit number identifying a port. A networking application is uniquely identified by the pair of IP address and port number.

Public IP address—An IP address that can be globally pinged or routed from Internet.

Private IP Address—An IP address of a device associated with a private network (e.g., a home network).

Firewall—A technological barrier, usually residing at a home gateway, designed to prevent unauthorized or unwanted communications between computer networks or hosts.

Network Address Translation (NAT)—The process of modifying IP address information in IP packet headers while in transit across a traffic routing device. A home gateway usually employs this mechanism to route data between public Internet and private home network.

Actuator—A type of device, including motors, switches, or regulators for moving and/or controlling a mechanism or system.

Sensor—A converter that measures a physical quantity and converts it into a signal which can be read by an observer or by an (mostly electronic) instrument.

Mesh Network—A type of network where each node not only captures and disseminates its own data, but also serves as a relay/router for other nodes, that is, it must collaborate to propagate the data in the network.

Node—A connection point, either a redistribution/routing point or a communication endpoint (some terminal equipment). A physical network node is an active electronic device that is attached to a network, and is capable of sending, receiving, and/or forwarding information over a communications channel.

Home Automation (HA)—Automation of the home, housework, or household activity. Home automation may include centralized control of lighting, HVAC (heating, ventilation and air conditioning), appliances, and other systems, to provide improved convenience, comfort, energy efficiency, and/or security.

SGPC—Smart Gateway Power Controller, a networked device that can control electronics devices incorporating on/off power control and energy measurement capabilities. SGPC is WiFi based.

Companion Devices—A SGPC can communicate and coordinate with non-WiFi based devices to perform home automation functionality. These non-WiFi devices are called companion devices with respect to a SGPC.

Web Banner—A form of advertising on the World Wide Web delivered by an ad server. This form of online advertising entails embedding an advertisement into a web page.

Network Integration Overview

The present invention extends the functionality of SGPCs as detailed herein to incorporate extended network interactions and tighter integration of network functionality, home control functionality, and communication across and within the home gateway network interface. To this end, the present invention is generally focused on the inter-networking of multiple home automation devices (SGPCs being one example) and the interactions of HA devices as a group with users (a man-machine "social network") where information is pushed and pulled just as within a conventional social network. While the discussion herein is with respect to networks comprising SGPCs, the present invention is not necessarily limited to this particular type of network interface or communication methodology.

Within this overall network architecture, the issues that the present invention generally addresses include:

How multiple HA devices in a home form a network so that they can work in a coordinated/concerted way;

How the interactions with the users are affected when HA devices are formed as network;

How the content (setup, action, and monitoring of home devices) of the web server hosted at a HA device is delivered and presented to consumers; and How other opportunities, such as customized advertisement and web banners, are integrated in the man-machine interactions.

In the following discussion SGPCs are used to represent home automation devices to make the description more concrete. But the present invention scope applies to all WiFi base automation devices and non-WiFi based automation devices within a home automation networking context.

Smart Gateway Power Controller (SGPC) System Overview

The Smart Gateway Power Controller (SGPC) forms the basis of much of the functionality in the present invention and addresses the deficiencies associated with the prior art home automation systems. FIG. 1 (0100) generally illustrates the functional blocks of a typical SGPC, with one or more functional blocks being physically implemented as one component. It generally comprises a small form-factor device directly plugged into a power outlet. It contains one or more power sockets, into which consumers plug in power suppliers to their home appliances. One or more independent relay switches controlled by the MCU are connected to the socket(s). The switch(s) can be turned on and off by the MCU. A typical SGPC can measure the energy consumption of the plugged in appliances in terms of instant power consumption (watt), energy consumption (watt-hour), voltage and current. A typical SGPC is a cost-effective 3-in-1 home automation device: network gateway+load control switch+energy measurement. The small form factor of this device has the size of a regular power adaptor. On the networking side, it comprises two-way communication with the Internet and two-way DIRECT communication with a WiFi devices (PC, laptop, smartphone) at home.

A SGPC may optionally contain an alternative wireless module to communicate with an existing home automation device, to provide the latter the capability to be accessed from Internet. An existing automation device can be a ZIGBEE® or Z-WAVE® based device.

Figure 2:
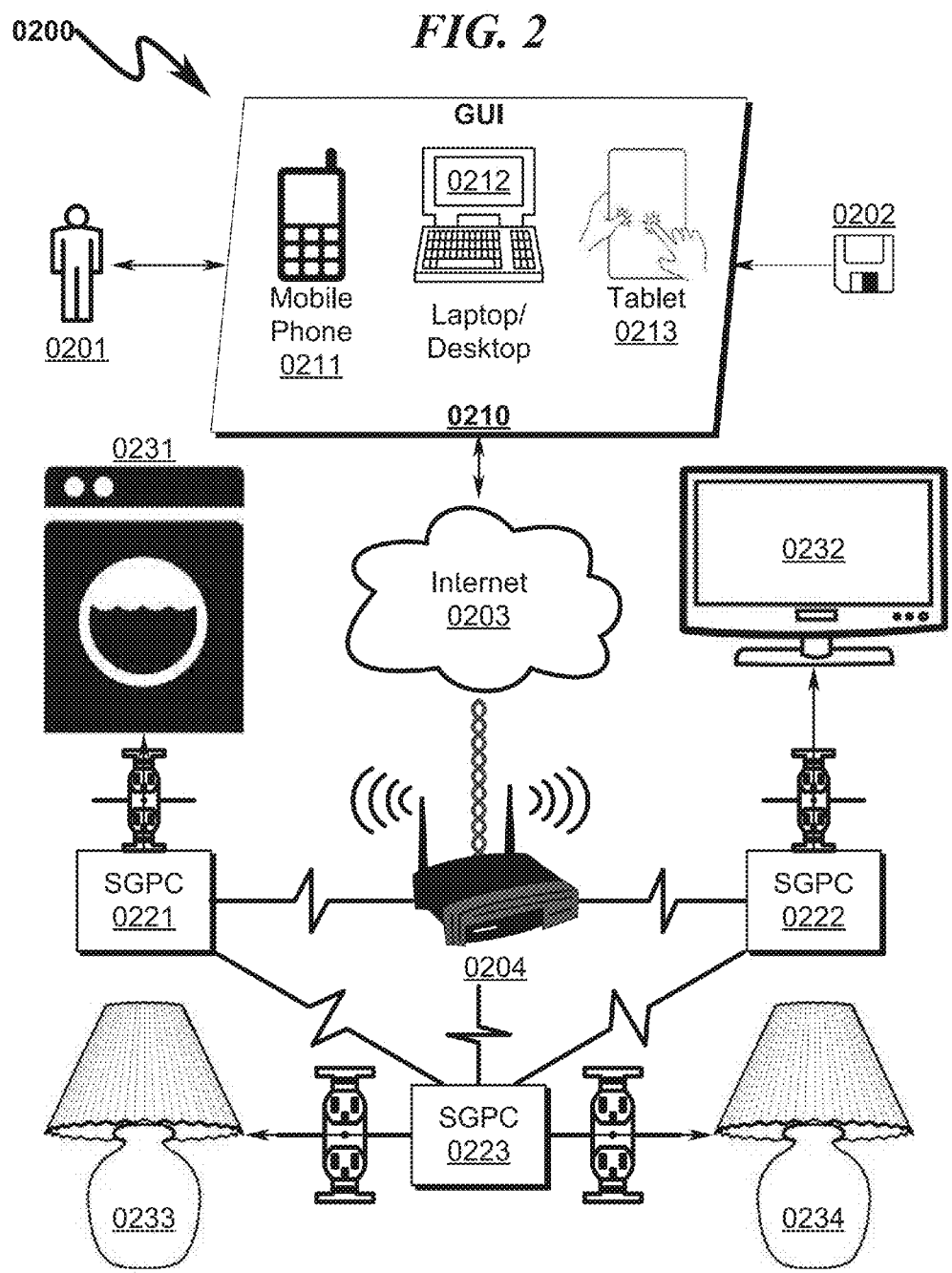
FIG. 2 illustrates a exemplary communications network diagram describing a presently preferred system embodiment of the present invention.

FIG. 2 (0200) generally illustrates the usage of the SGPC device. The following describes a typical use case scenario:

User opens a web page of a SGPC from anywhere at home or outside with her smartphone by typing a URL address along with some security information (e.g., password, etc).

The web page shows switch status, energy consumption of the connected consumer device(s) at home.

User clicks a button to turn on or off a switch instantly or choose a schedule—time based or event based—to turn on or off the switch at a later point.

User then registers his email address in the web page for the SGPC to forward any events or message to their email account (e.g., switch status change, energy consumption above a threshold, etc.).

User also downloads a (platform independent) software program or data to their smartphone that would provide additional functionality, for example, to view a histogram of her energy consumption in a more detailed fashion on their smartphone.

This system can be better described in terms of the networking architecture, functionality provided by the SGPC, and interaction between users and a typical SGPC configuration. This information is provided in more detail below.

Networking Architecture

Network Structure

Subnet and Sub-Gateway (0300, 0400, 0500, 0600, 0700)

Figure 3:
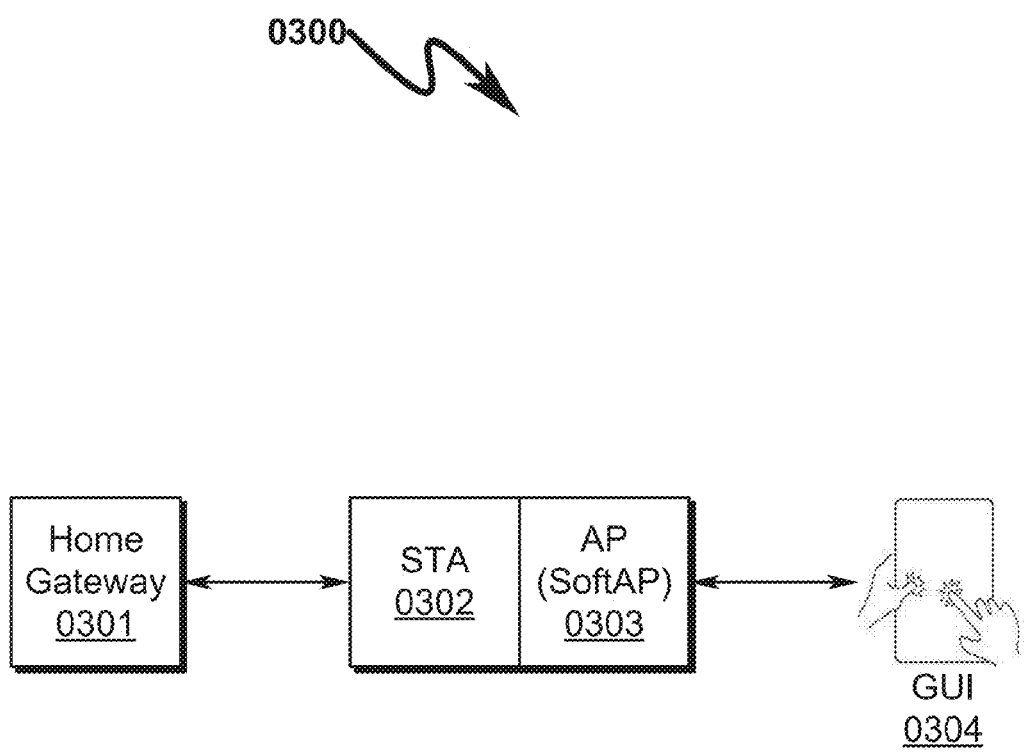
FIG. 3 illustrates a system block diagram describing how a SGPC plays two roles (AP and STA) in some present invention embodiments.

A SGPC works with home residential gateway as a client (station), and use the residential gateway to communicate with the Internet cloud. On the other side, it serves as a secondary or sub-gateway to a subnet that consists of a set of WiFi based client devices it has control over, as well as any consumer devices that can communicate with it. If the SGPC has the wireless interface to communicate with ZIGBEE® devices, it can also control and read data from the latter. FIG. 3 (0300) illustrates the two roles a SGPC plays.

Figure 4:
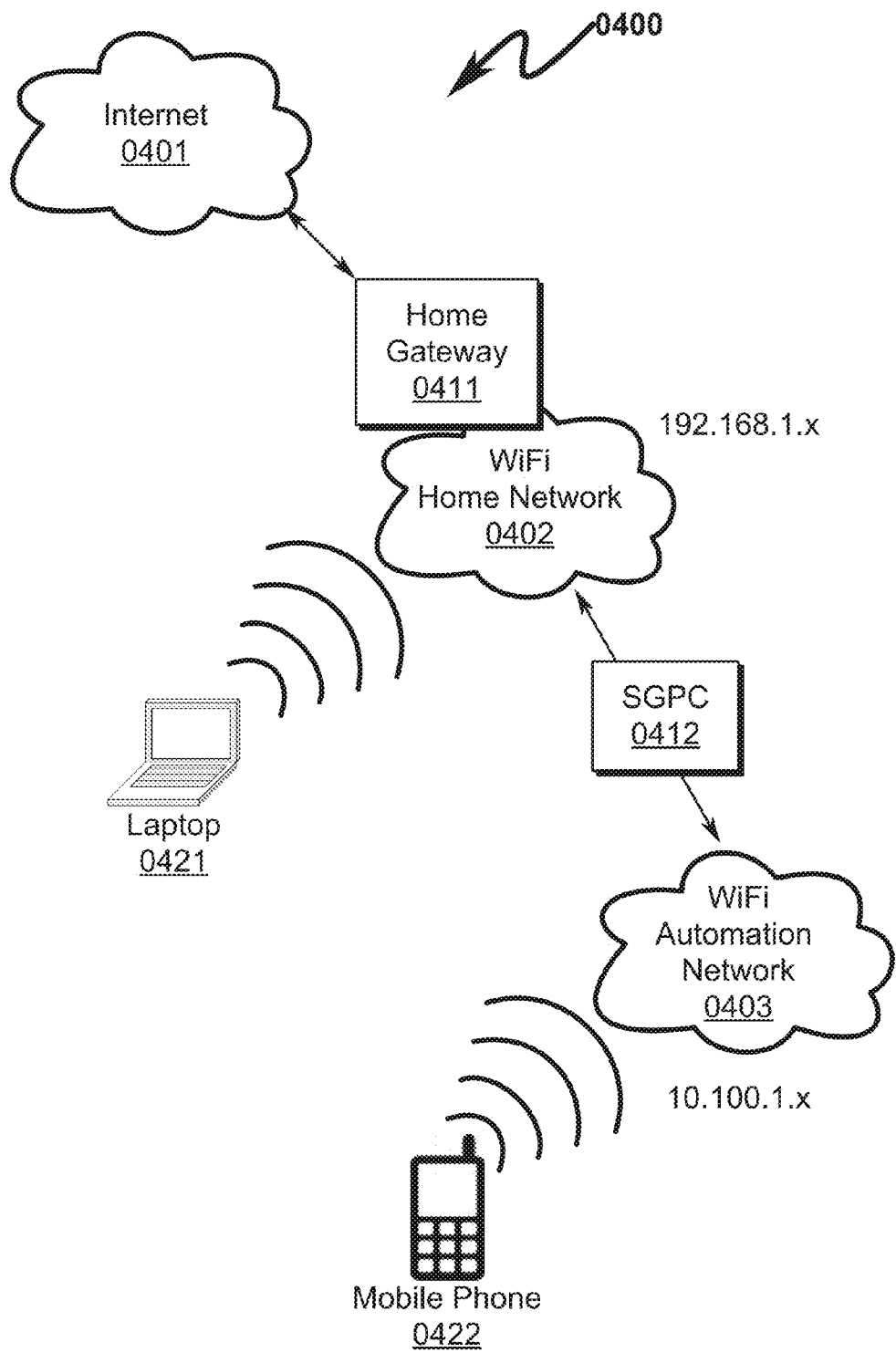
FIG. 4 illustrates a network diagram describing a typical WiFi home automation Subnet.

In other words, SGPC is a sub-gateway that "separates" the home automation network from the existing home network, while having the two networks communicating with each other. The home automation network has different subnet address than that of the home network. FIG. 4 (0400) illustrates a typical configuration setup.

A SGPC can communicate with WiFi and ZIGBEE® based sensors, and the sensor data can be used to schedule turning on and off the switch, as well as reported to consumers. It can communicate with any devices (WiFi based, ZIGBEE® based, another SGPC) devices to coordinate the control actions.

Figure 5:
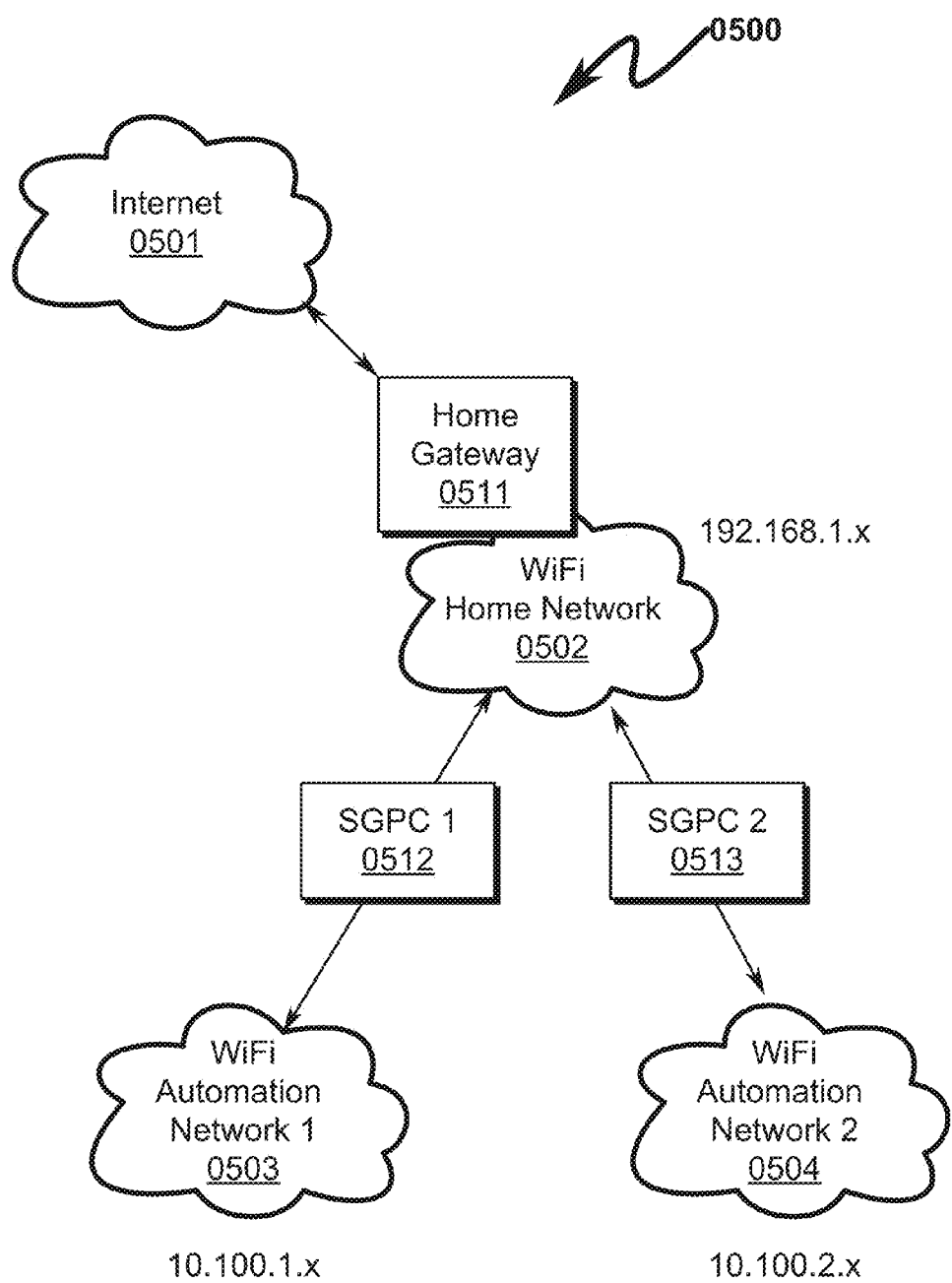
FIG. 5 illustrates an exemplary network diagram describing two SGPCs and their subnets that are both connected to a home gateway.
Figure 6:
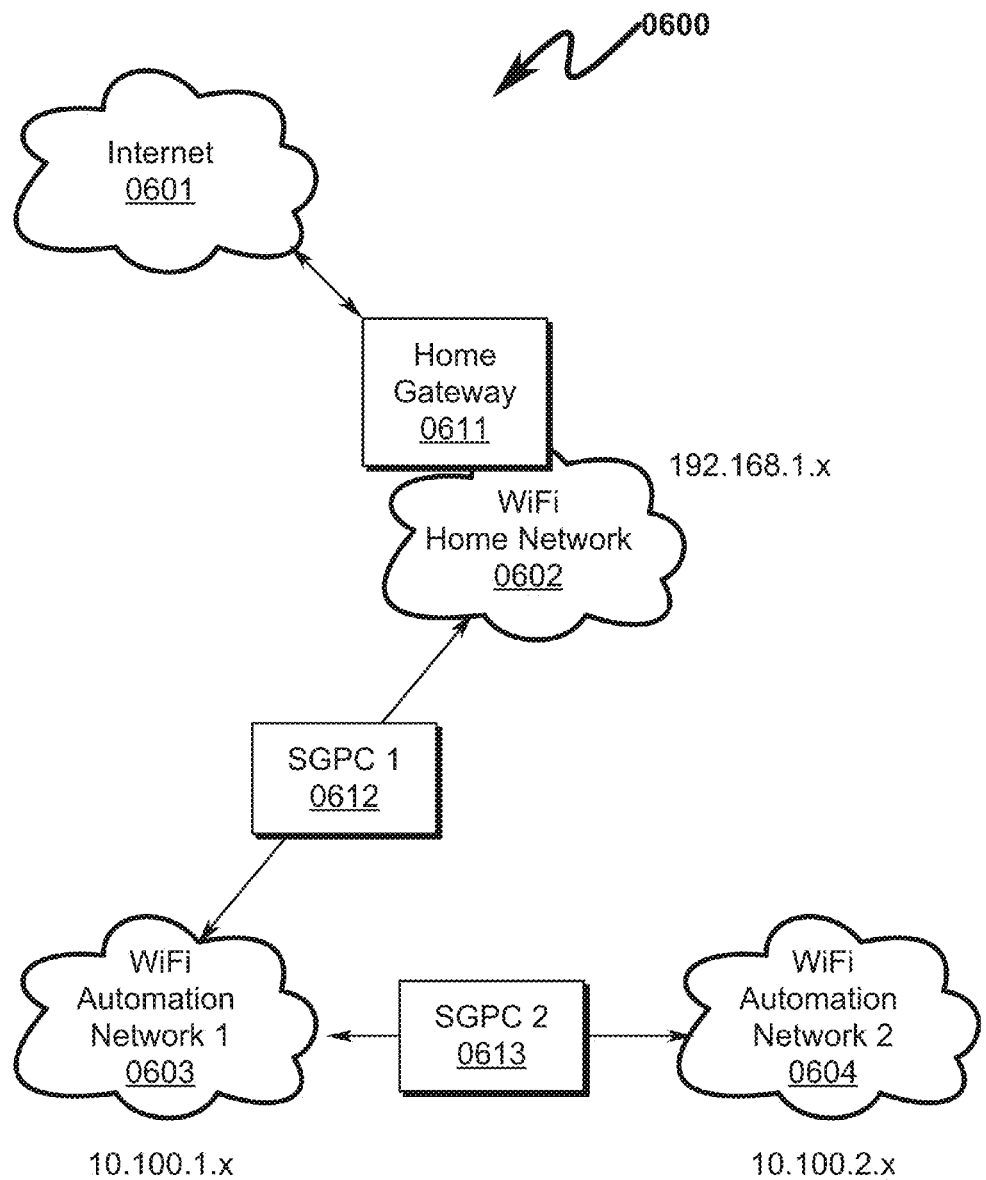
FIG. 6 illustrates an exemplary network diagram describing two SGPCs and their subnets that are both connected to each other (subnet "gatewayed" by an earlier deployed SGPC)

FIG. 5 (0500) and FIG. 6 (0600) illustrate examples of multiple SGPC devices with different network topologies. These SGPC have their own subnet and can talk to each other as in an IP mesh network.

Figure 7:
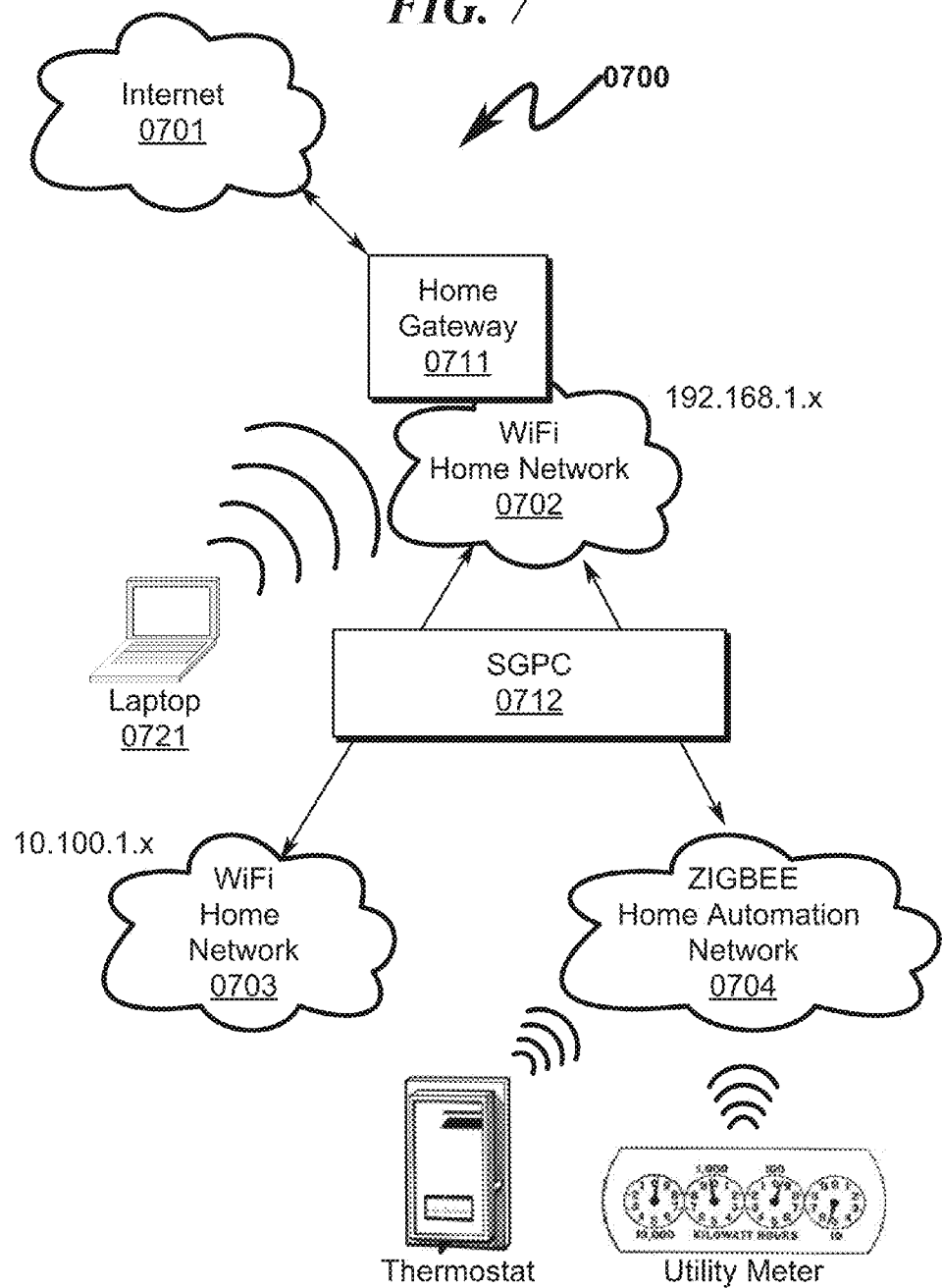
FIG. 7 illustrates an exemplary network diagram wherein a SGPC communicates with a ZIGBEE® network.

FIG. 7 (0700) shows a case where SGPC can communicate with ZIGBEE® network. As an example of multiple SGPC communicating with each other, when a TV is turned on with one SGPC, the light controlled by another SGPC may be turned off.

Another example is that when a ZIGBEE® based temperature sensor reads a data above a threshold (set by consumer on the SGPC), the SGPC connected to an air conditioner turns on. The advantage of separating the switch and sensors, as opposed to the thermostat where the switch and sensor are in the same location, is that users can put the sensor anywhere they want the air conditioner to be responsive.

It should be noted that the network architecture described here is different from the WiFi ad-hoc and WiFi-direct mode in that:

WiFi ad-hoc is a point-to-point communication while the present invention architecture is point-to-multiple points; and WiFi-direct cannot have its own subnet, and does not have the relay/routing capability mentioned above.

WiFi-direct is generally a good methodology for point-to-point communication, but not for a server-client situation.

Preferred Exemplary SGPC Architecture (0800)-(1600)

Figure 8:
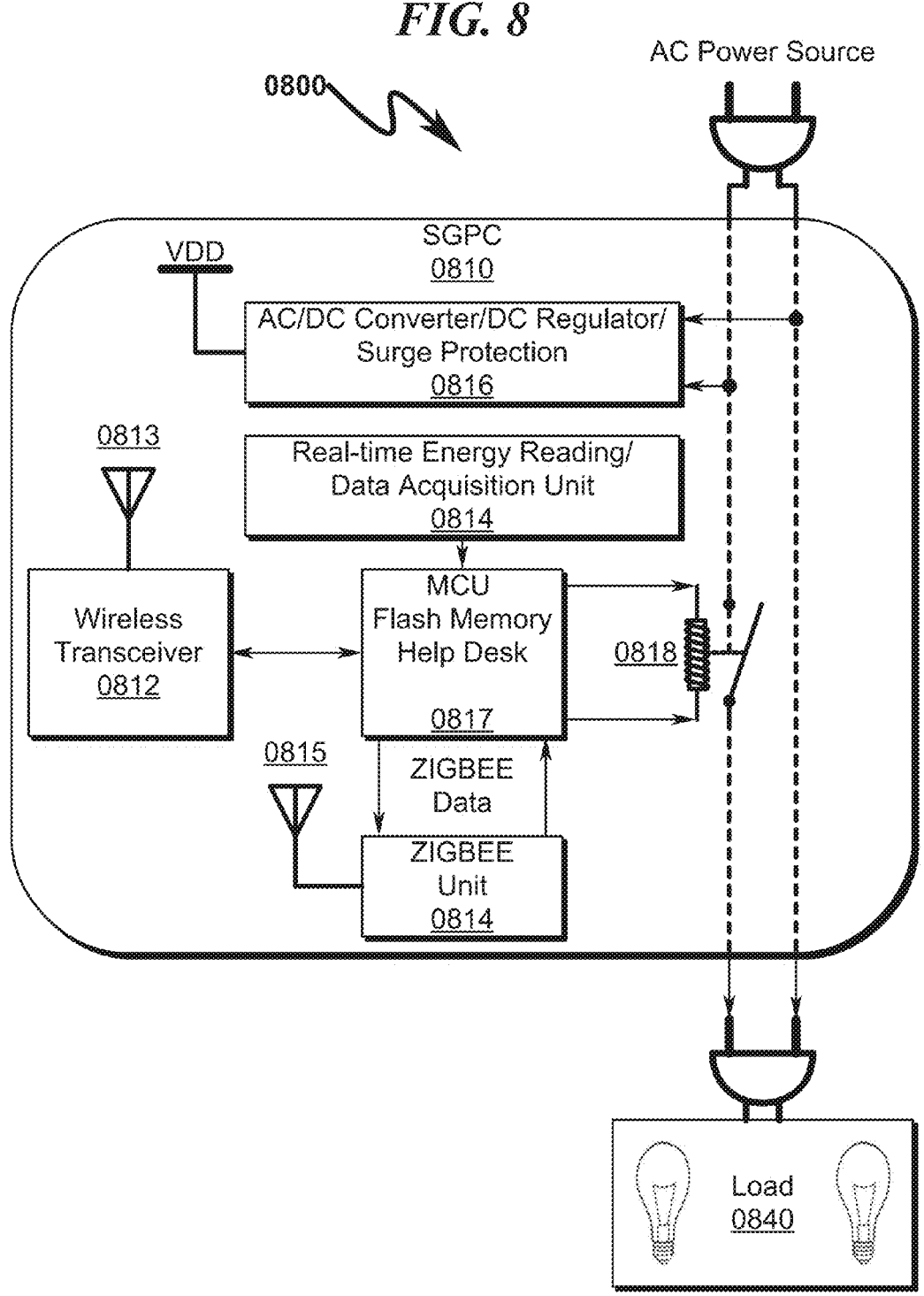
FIG. 8 illustrates an exemplary system block diagram of a typical SGPC embodiment of the present invention.
Figure 9:
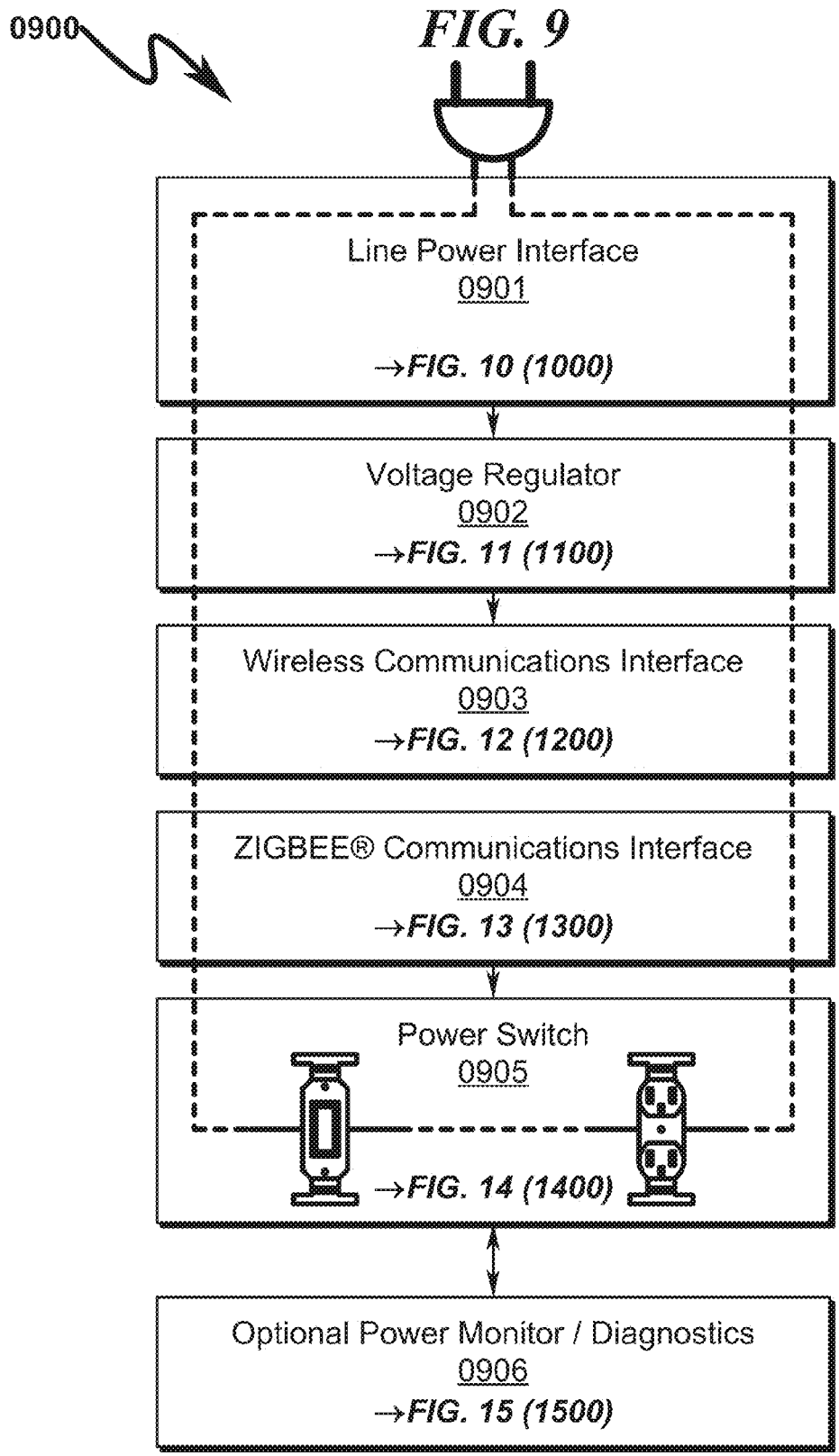
FIG. 9 illustrates an exemplary schematic block diagram of a preferred exemplary SGPC embodiment.
Figure 10:
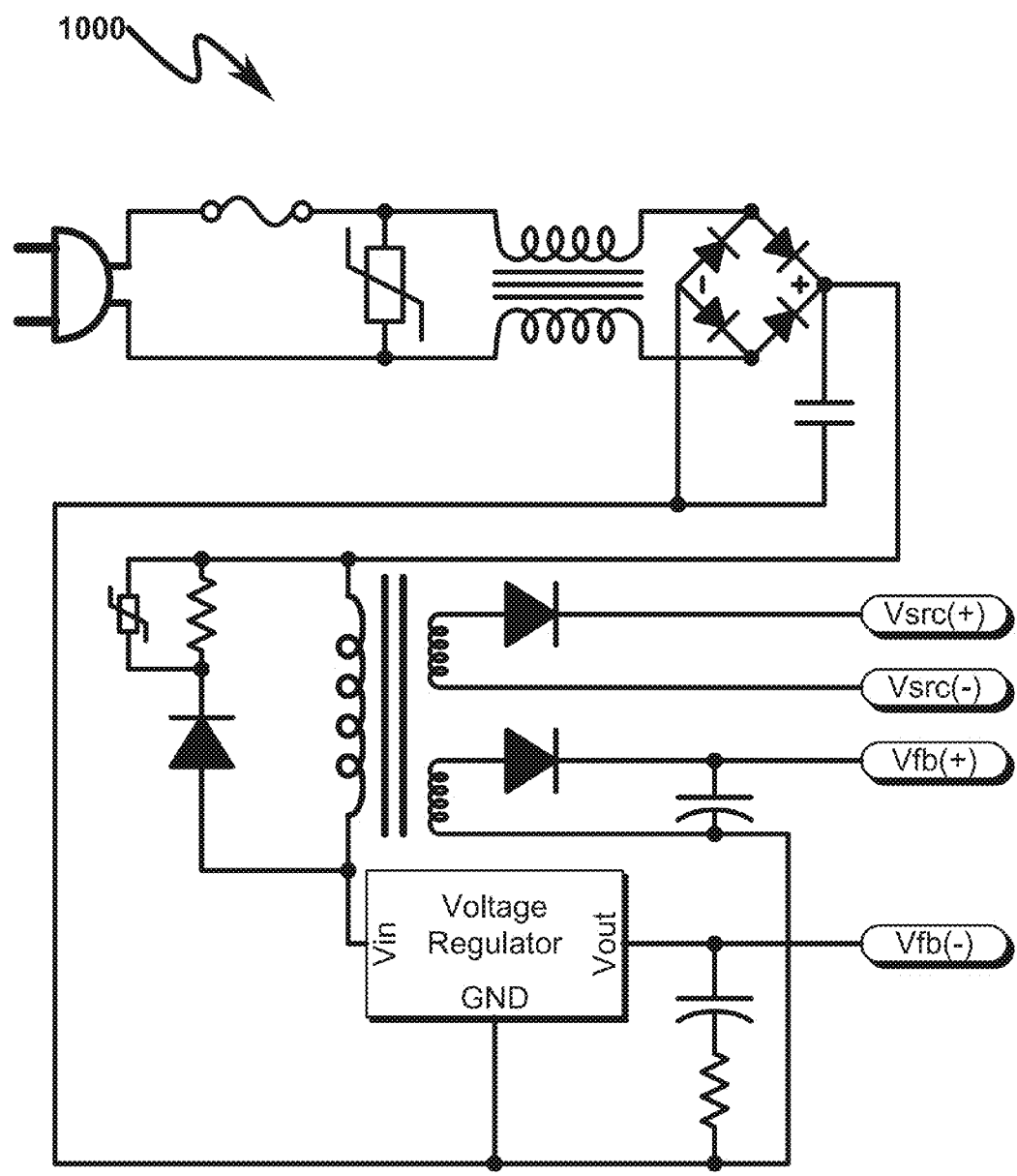
FIG. 10 illustrates an exemplary schematic of a preferred exemplary SGPC Line Power Interface embodiment.
Figure 16:
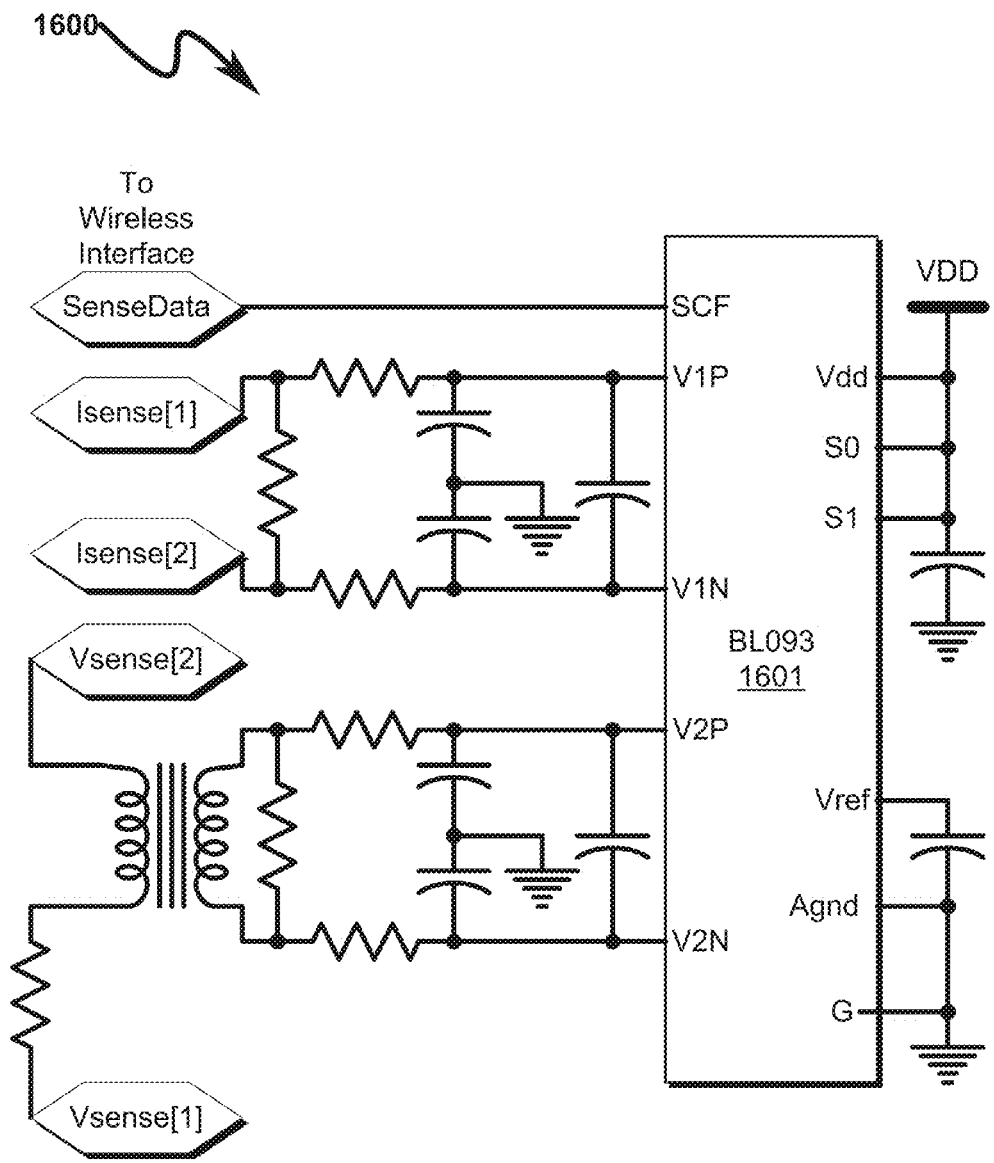
FIG. 16 illustrates an exemplary schematic of a preferred exemplary SGPC Energy Measurement embodiment.

A preferred exemplary system electrical block diagram of a typical SGPC system is generally illustrated in FIG. 8 (0800)-FIG. 9 (0900), with exemplary detail of these system blocks depicted in FIG. 10 (1000)-FIG. 16 (1600). This preferred embodiment comprises the following circuits:

Line Power Interface (0901)—As detailed in FIG. 10 (1000), the input outlet brings 110V AC in through the fuse and split into two paths. The first path converts the AC voltage to a DC voltage by 4-diode bridge rectifier. A transformer steps down the voltage to the level for further regulation. DC regulator (U3) provides +5 VDC supply for the remaining circuits of the unit. The second path brings 110V AC voltage forward to the output socket via a power relay in the power switch (0905) as detailed in FIG. 15 (1500).

Figure 11:
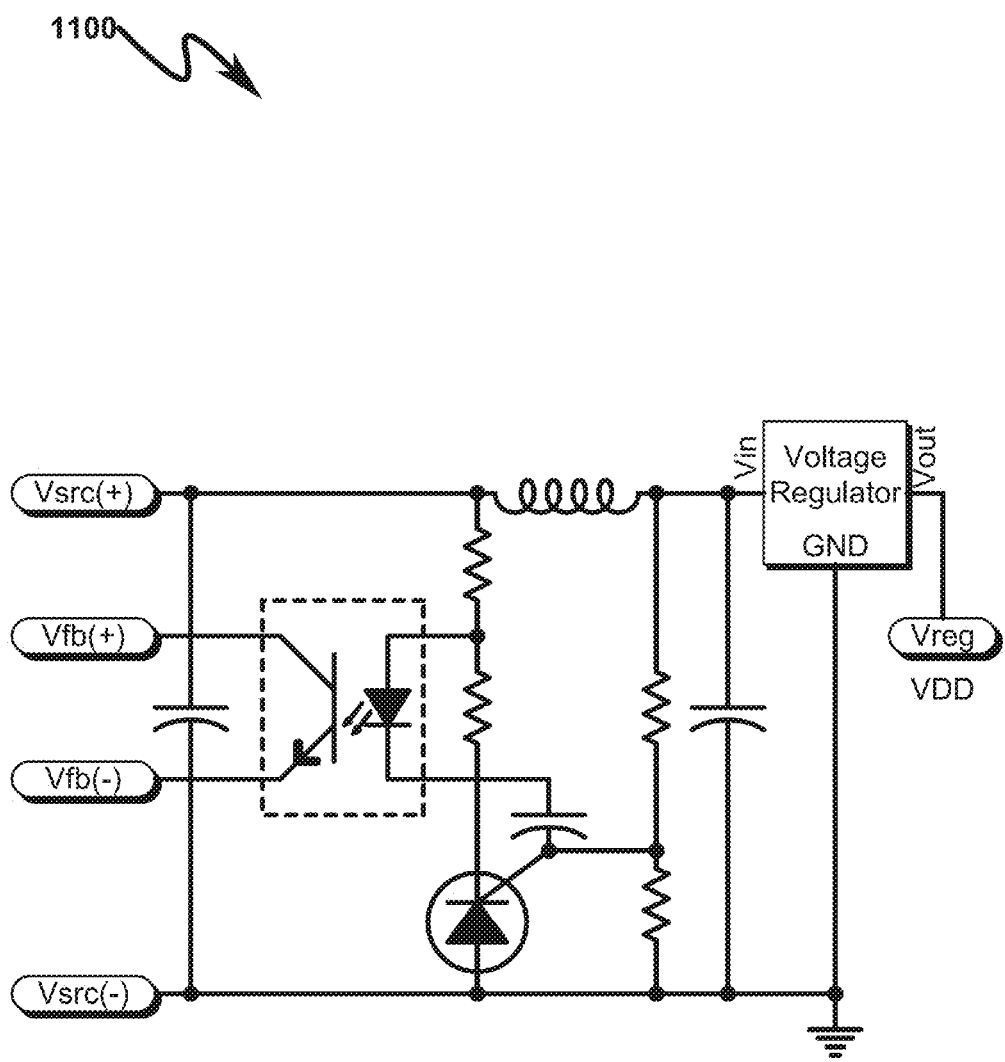
FIG. 11 illustrates an exemplary schematic of a preferred exemplary SGPC Voltage Regulator embodiment.

Voltage Regulator (0902)—As detailed in FIG. 11 (1100), the DC Regulator brings +5 VDC from the line power interface (0901) further down to +3.3 VDC for supplying a wireless transceiver in the wireless communications interface (0903).

Figure 12:
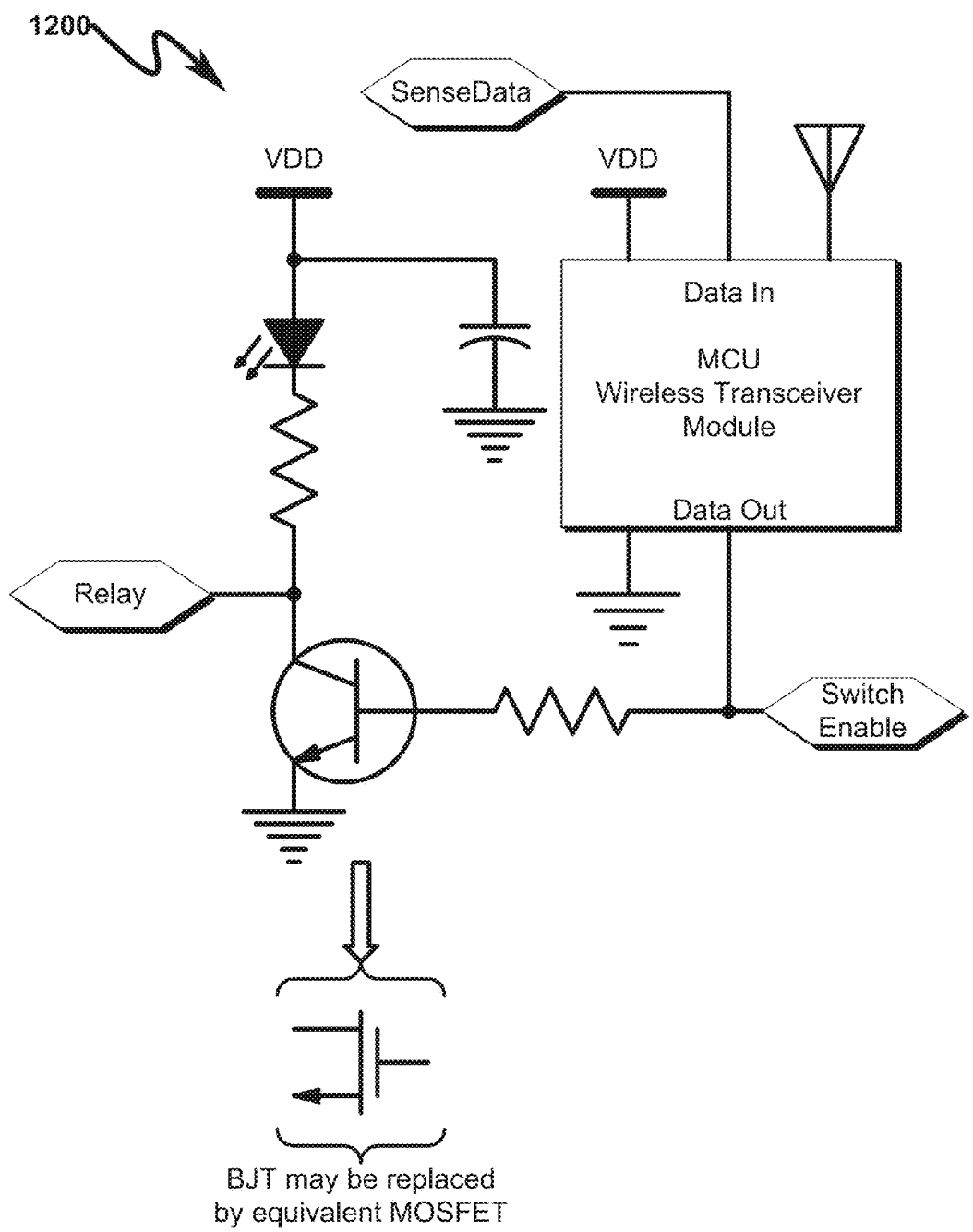
FIG. 12 illustrates an exemplary schematic of a preferred exemplary SGPC MCU/Wireless Communication Interface embodiment.

Wireless Communications Interface (0903). As detailed in FIG. 12 (1200), a wireless transceiver receives the commands from the computer or/and other WiFi or wireless device. The received command via the wireless receiver interface (not shown) will provide a logic signal (SWITCH) to turn on/off the transistor switch (Q1). Q1 controls the on/off position of the power relay in the power switch circuitry (0905) based on commands from the PMCU and may optimally be implemented using bipolar or MOS fabrication technologies. Some preferred embodiments of the present invention may use a GainSpan WiFi module that contains a WiFi SOC chip (this SOC chip contains the baseband and wireless transceiver and an integrated microcontroller unit).

Figure 13:
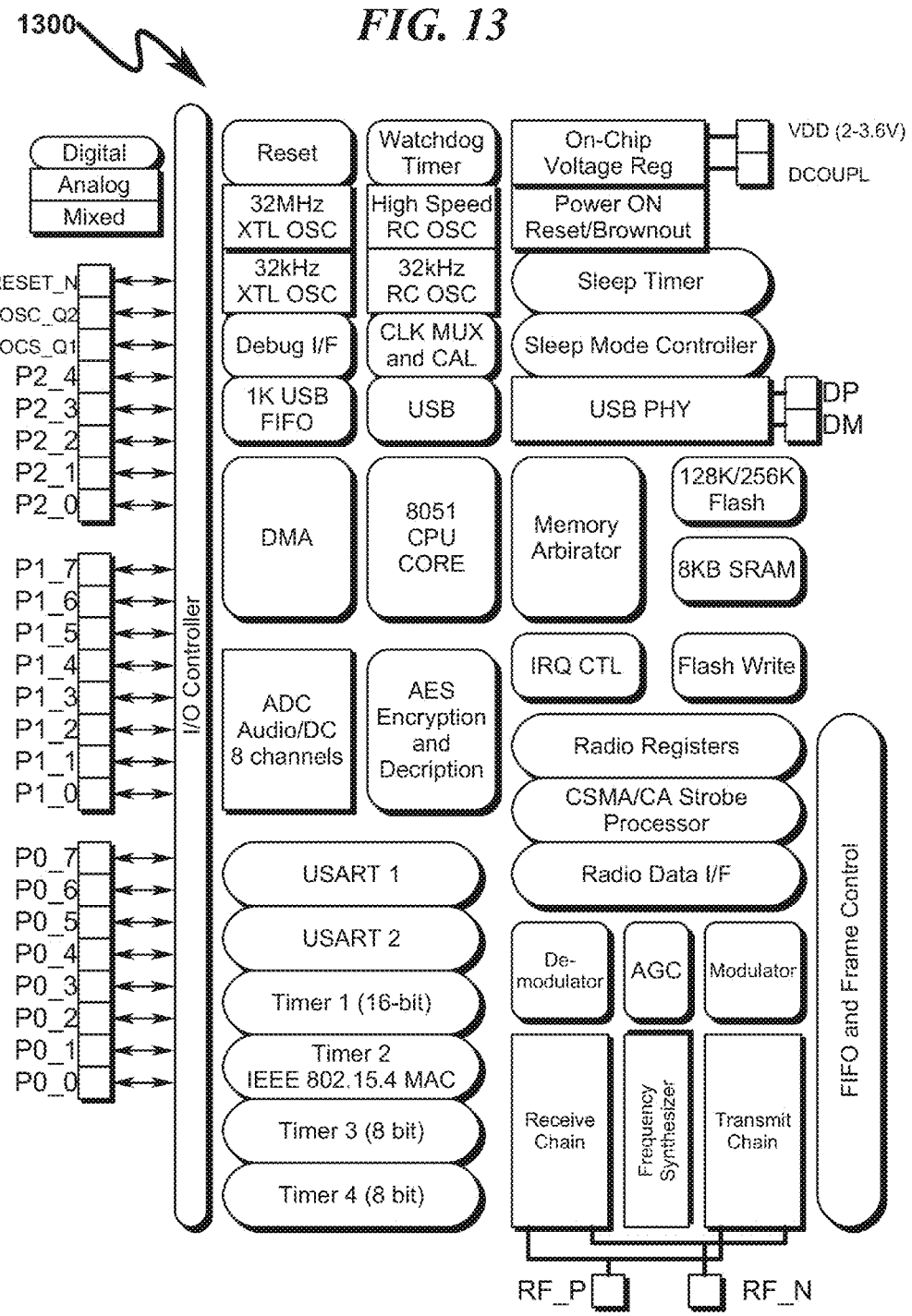
FIG. 13 illustrates a system block diagram of an exemplary SGPC ZIGBEE® transceiver interface integrated circuit useful in some preferred embodiments of the present invention.
Figure 14:
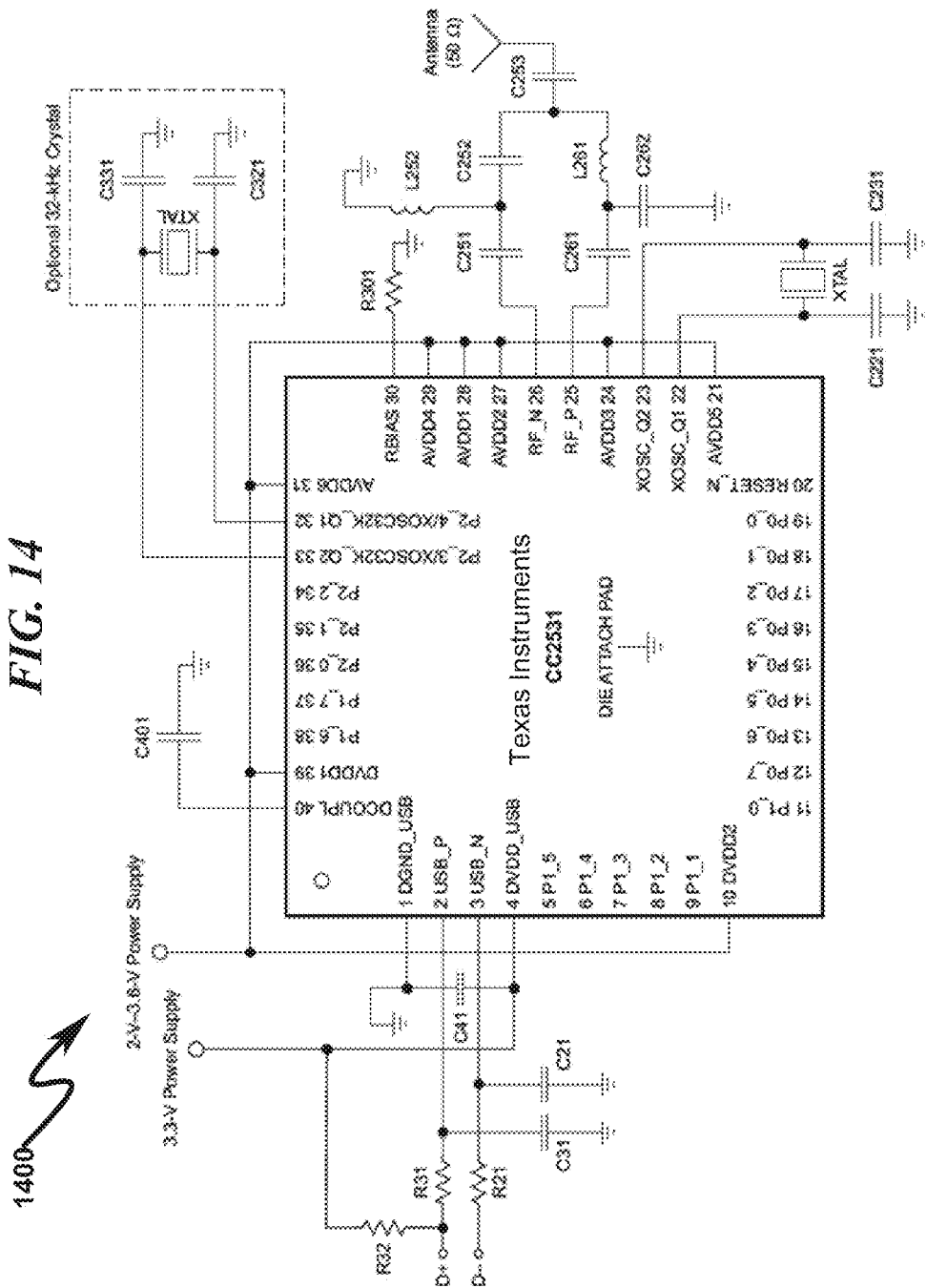
FIG. 14 illustrates an exemplary schematic block diagram of an exemplary SGPC ZIGBEE® transceiver interface integrated circuit useful in some preferred embodiments of the present invention.

ZIGBEE® Wireless Interface (0905). As generalized in FIG. 8 (0800) and detailed in FIG. 13 (1300) and FIG. 14 (1400), the SGPC (0810) may incorporate a ZIGBEE® interface (0814) in the overall SGPC design to permit heterogeneous wireless networks using SGPCs to communicate with a wide variety of existing home automation wireless networks. While a wide variety of embodiments of this wireless interface are anticipated, a preferred embodiment incorporates the use of a Texas Instruments model CC2531 ZIGBEE® communications controller as generally illustrated by the block diagram of FIG. 13 (1300) and exemplary implementation schematic of FIG. 14 (1400).

Figure 15:
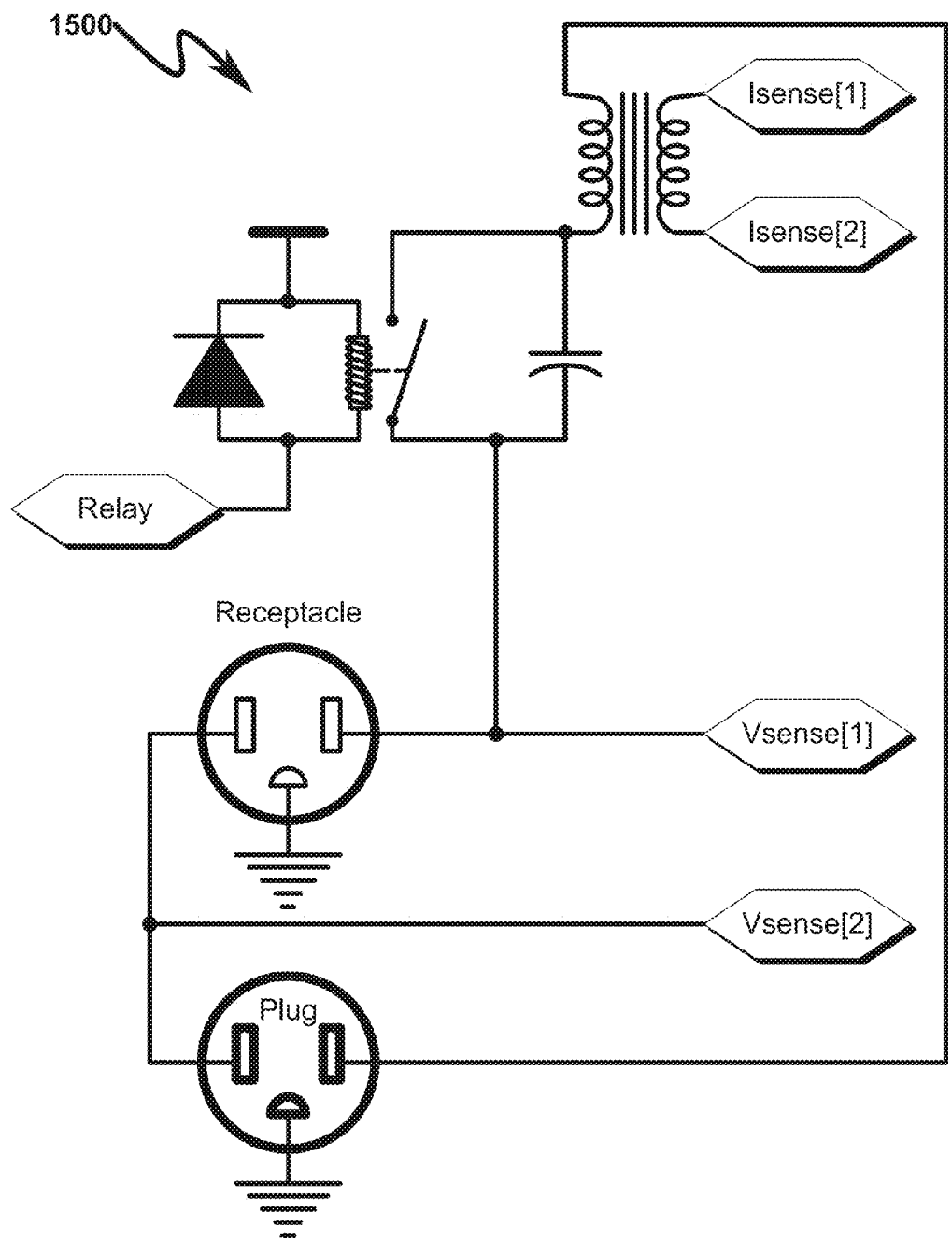
FIG. 15 illustrates an exemplary schematic of a preferred exemplary SGPC Power Switch embodiment.

Power Switch (0905)—As detailed in FIG. 15 (1500), a power relay is a gate between the line power interface power input and the output power outlet and is controlled by the transistor switch in the wireless communications interface (0903). The power relay is protected from the over current surge by a Zener diode.

Energy Measurement (0906)—As detailed in FIG. 16 (1600), an integrated circuit (IC) (1601) is incorporated for measuring energy consumption. One skilled in the art will recognize that many forms of energy measurement circuits may be deployed to achieve this functionality.

One skilled in the art will recognize that these functional blocks may be implemented in a wide variety of ways well known to those skilled in the art of circuit design and as such are only exemplary of the techniques taught by the present invention.

Summary of SGPC Functionality (1700)

Figure 17:
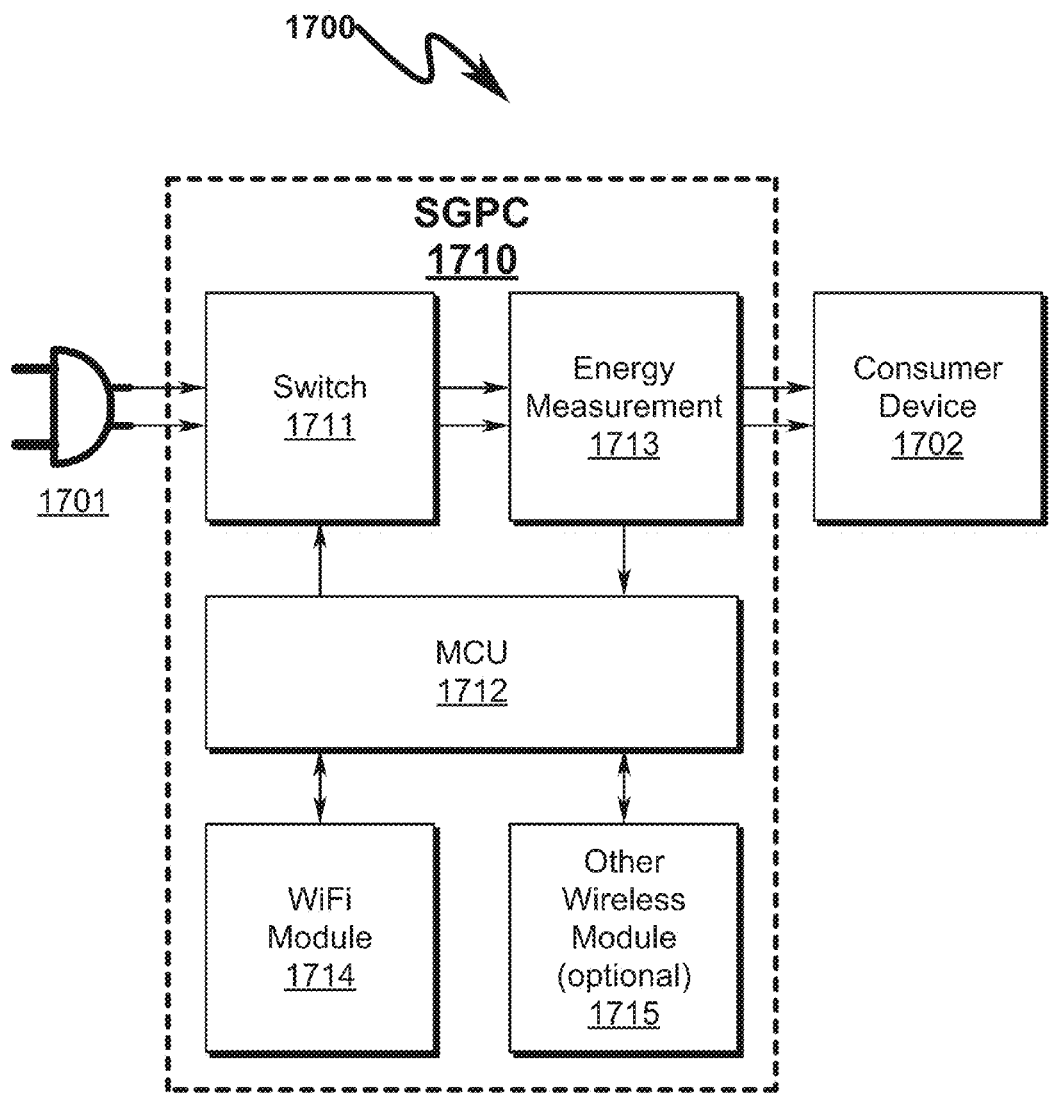
FIG. 17 illustrates an exemplary overview block diagram of a typical SGPC used in some preferred embodiments of the present invention.

A summary of SGPC functionality will now be presented. As illustrated in FIG. 17 (1700), the SGPC may be generally described in terms of several functional blocks. The SGPC (1710) is generally a small form-factor device that is directly plugged into a power outlet (1701). It contains one or more power sockets, into which consumers plug in power cords connected to their home appliances or consumer devices (1702). One or more independent relay switches (1711) controlled by a MCU (1712) are connected to the socket(s). The switch(s) (1711) can be turned on and off by the MCU (1712). The SGPC can measure the energy consumption (1713) of the plugged in appliances in terms of instant power consumption (watt), energy consumption (kilo-watt-hour), voltage and current.

A SGPC contains a WiFi module (1714), and may communicate with the Internet via a (home) gateway and communicate directly with a WiFi devices (PC, laptop, smartphone) at within the localized HA environment. A SGPC can optionally contain an alternative wireless module (1715) to communicate with an existing home automation device, to provide the latter the capability to be accessed from Internet. An existing automation device can be a ZIGBEE® or Z-WAVE® based device.

Consumers may connect their Internet devices directly via WiFi interface with a SGPC or from the Internet, and open a web page hosted on the SGPC and monitor the power consumption of the plugged in appliance(s) and control the switch(s) that turn on/off the appliance(s).

A SGPC is a particular type of home automation device. However, it should be stressed that the teachings of the present invention apply to any home automation (HA) device based on IP that supports a web server interface. Within the following discussion the terms SGPC will be used interchangeably with "HA devices."

Preferred Method Structural Overview (2400)

Figure 24:
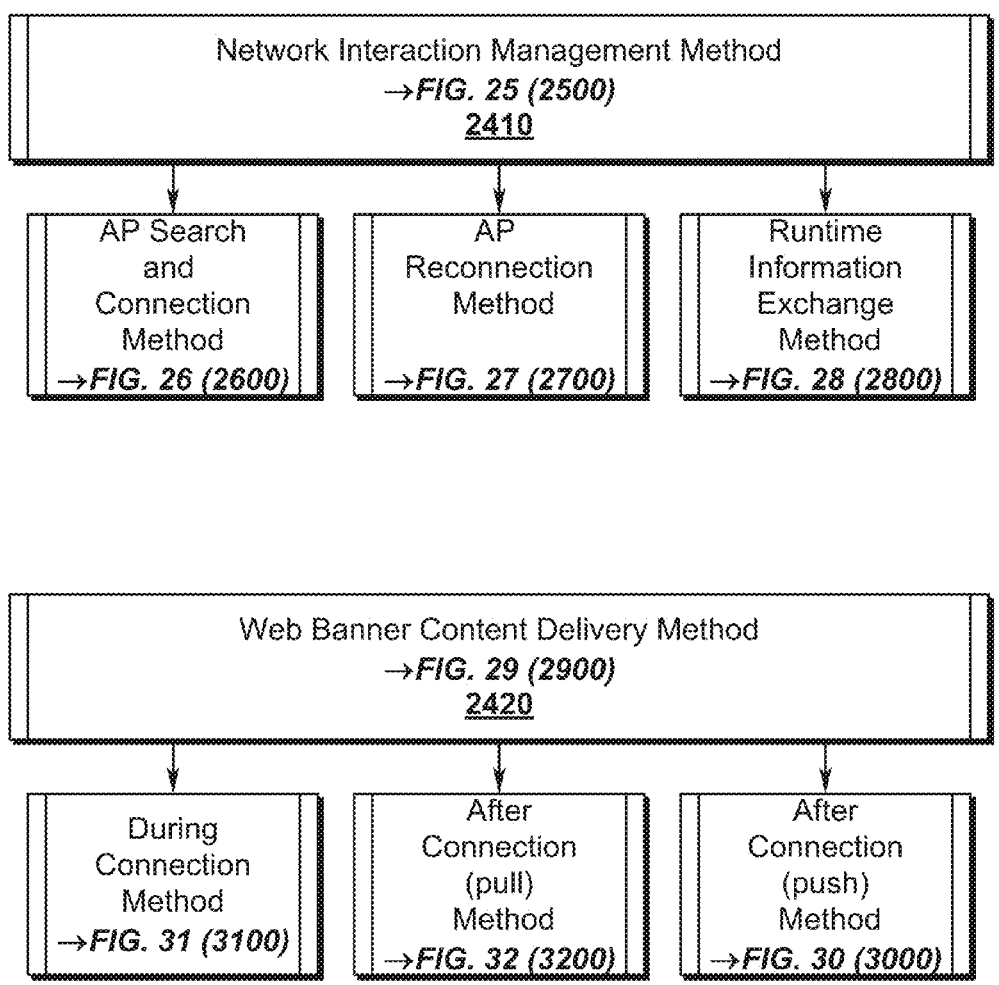
FIG. 24 illustrates an overview flowchart of subprocesses utilized in some preferred embodiments of the present invention.

While the present invention may be implemented in a variety of methods, some preferred methods are generally illustrated by the flowchart structure detailed in FIG. 24 (2400). This general overview diagram details the relationships between major functional blocks of the network interaction management methods (2410) and the web banner content delivery methods (2420) that are discussed in more detail below.

Inter-HA Device Networking

Figure 18:
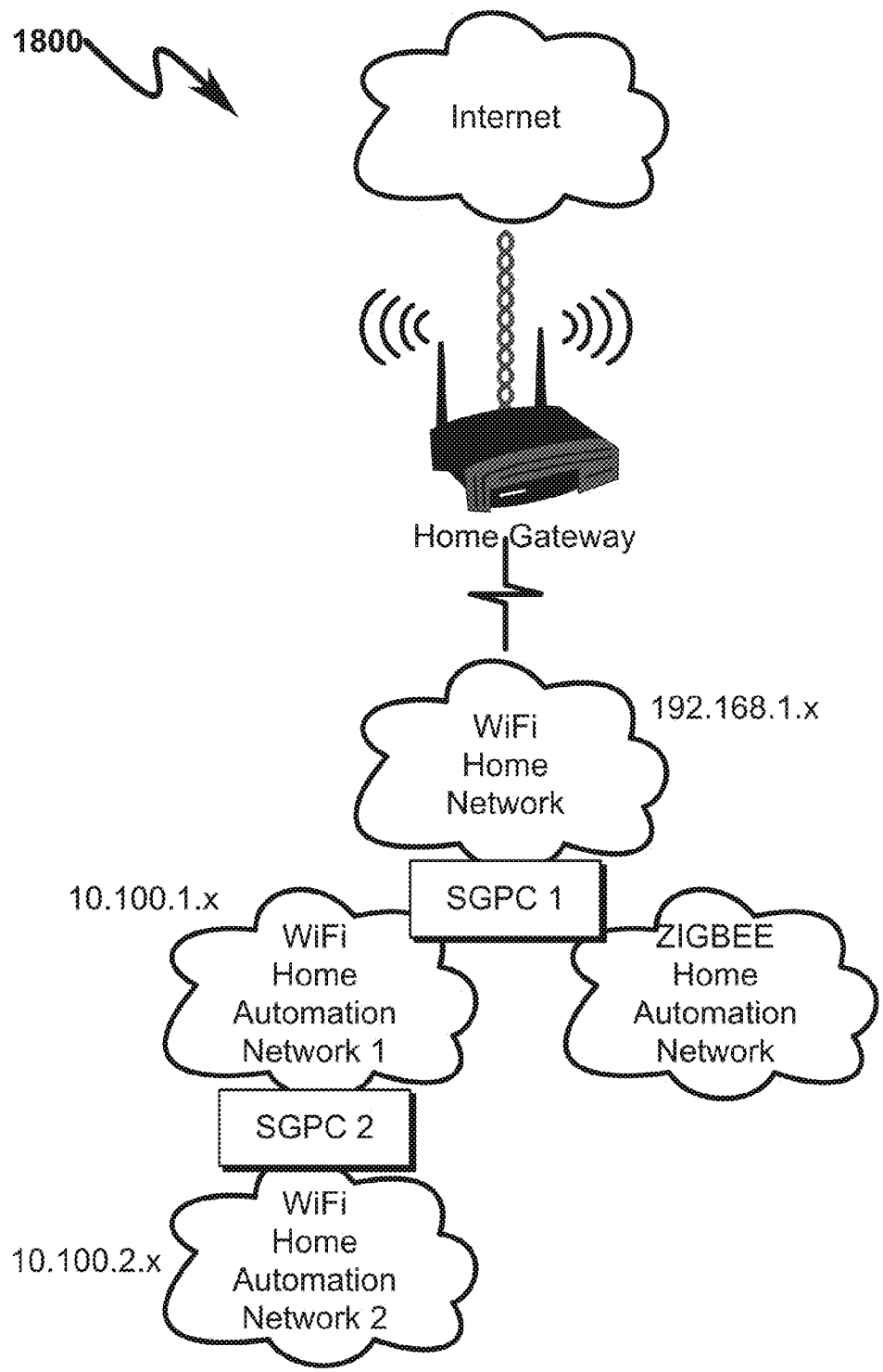
FIG. 18 illustrates an exemplary application context of the present invention in which SGPCs are configured in a tiered home automation network tree structure.

When multiple SGPCs are deployed at home, they may work as independent devices or work as a group in a coordinated way. A SGPC may have its own subnet as an AP while joining another network as a client. This "double role" has been mentioned earlier and discussed in the Provisional Patent Application for POWER CONTROL SYSTEM AND METHOD referenced above. In addition, a SGPC may contain a gateway into a non-WiFi network, such as ZIGBEE® network. FIG. 18 (1800) generally illustrates the "multiple roles" a SGPC can play. In FIG. 18 (1800), SGPC2 is a station/client to SGPC1 in SGPC1's subnet and SGPC2 has its own subnet. A given SGPC contains a router that routes information between subnets.

When multiple SGPCs are connected including their non-WiFI subnets, a heterogeneous network is formed, where WiFi based SGPCs connect with each other, and with other types of networks, such as ZIGBEE® subnet, via a network gateway, etc. From a user's standpoint, the communication between these devices (WiFi, ZIGBEE®, BLUETOOTH®) is transparent, and all these devices are created equal—they can do something and may work together to achieve this goal. What is taught by the present invention herein is the networking between SGPCs and their associated non-WiFi subnets. The organization and presentation of the information on how they are connected for management and diagnostic purposes is discussed later.

Figure 25:
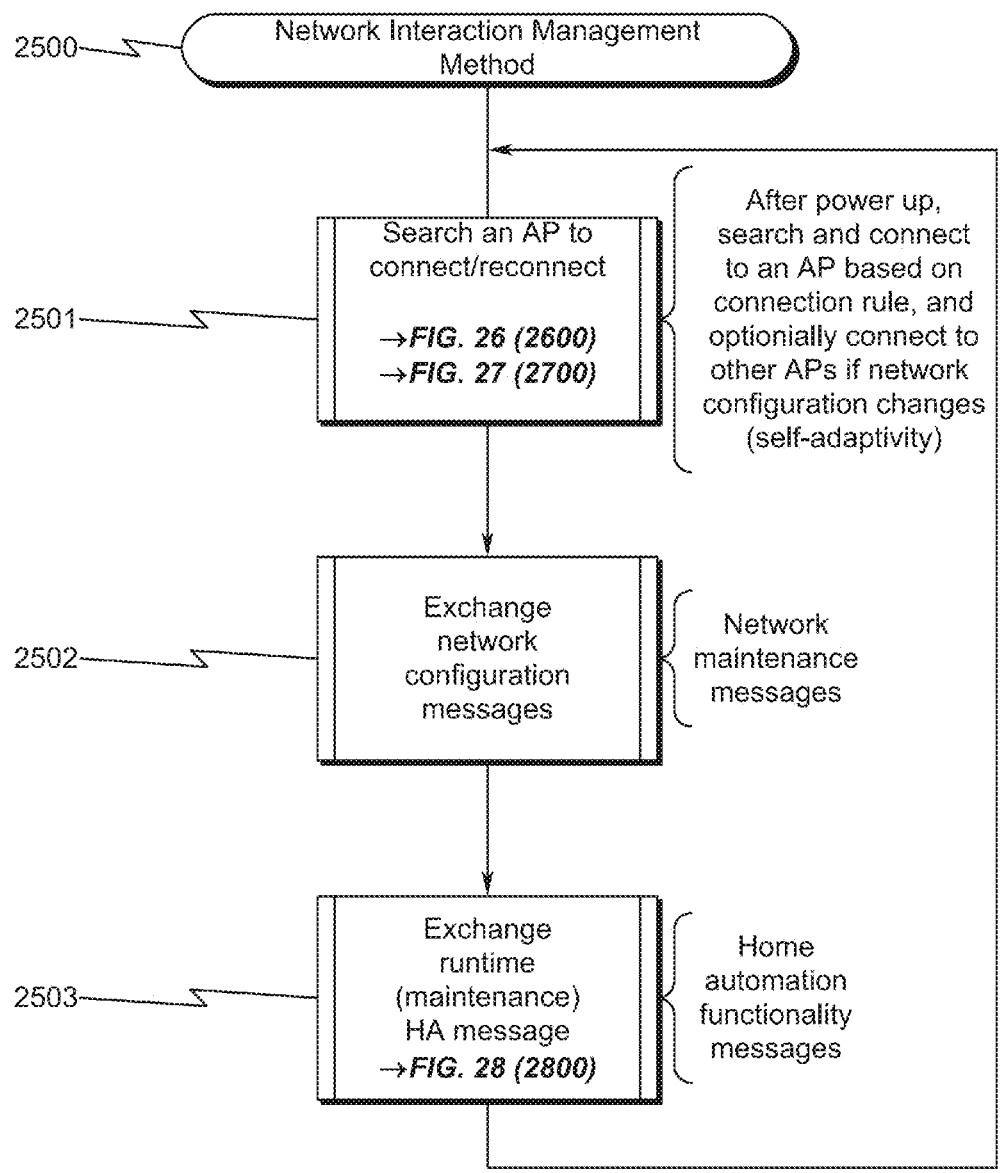
FIG. 25 illustrates an exemplary network management interaction flowchart useful in some preferred embodiments of the present invention.

As generally illustrated by the flowchart of FIG. 25 (2500), the overall flow in managing HA home network can be described in the following steps:
Forming a network (2501);
Exchanging networking configuration and device capability (2502); and
Exchanging home automation related information (2503).
Repeating these steps in sequence.

Forming a Network of HA devices

The multiple SGPCs will form a tree like network, or a mesh network. A variety of network configuration scenarios are anticipated in conjunction with the present invention, including but not limited to the specific scenarios detailed below.

Scenario 1 (Initial Self-Formed Network)

Consumers deploy one SGPC after another. These SGPCs will form a tree like structure as generally illustrated in the user interface (UI) in FIG. 22 (2200). The tree root is the first deployed SGPC. For any node (acting as an AP), its clients form its children nodes. Once a SGPC is powered up, it scans the frequency space, looking for any APs (early-deployed SGPCs or home gateway). It chooses an AP based on predefined rules, such as the signal strength of the AP, or the SSID, or the capability of the SGPC. The choices will be based on a rule or the combination of rules.

Signal Strength Rule

The signal strength rule is easily understand as it involves selecting an AP based on the highest available SGPC wireless signal strength, and will not be discussed here.

SSID Rule

All SGPCs will have SSID in certain pattern, for example, "CompanyID—xxx". By searching the pattern, a SGPC will be able to detect other SGPCs as candidates to connect. Note that a SGPC can choose not to join any existing SGPC subnet, and instead just join the primary home network if the "joining" rule dictates this behavior.

Capability Rule

SGPCs broadcast their capabilities to each other—to be discussed later. A SGPC may be configured to connect to SGPCs with certain capabilities.

AP Search and Connection Method (2600)

Figure 26:
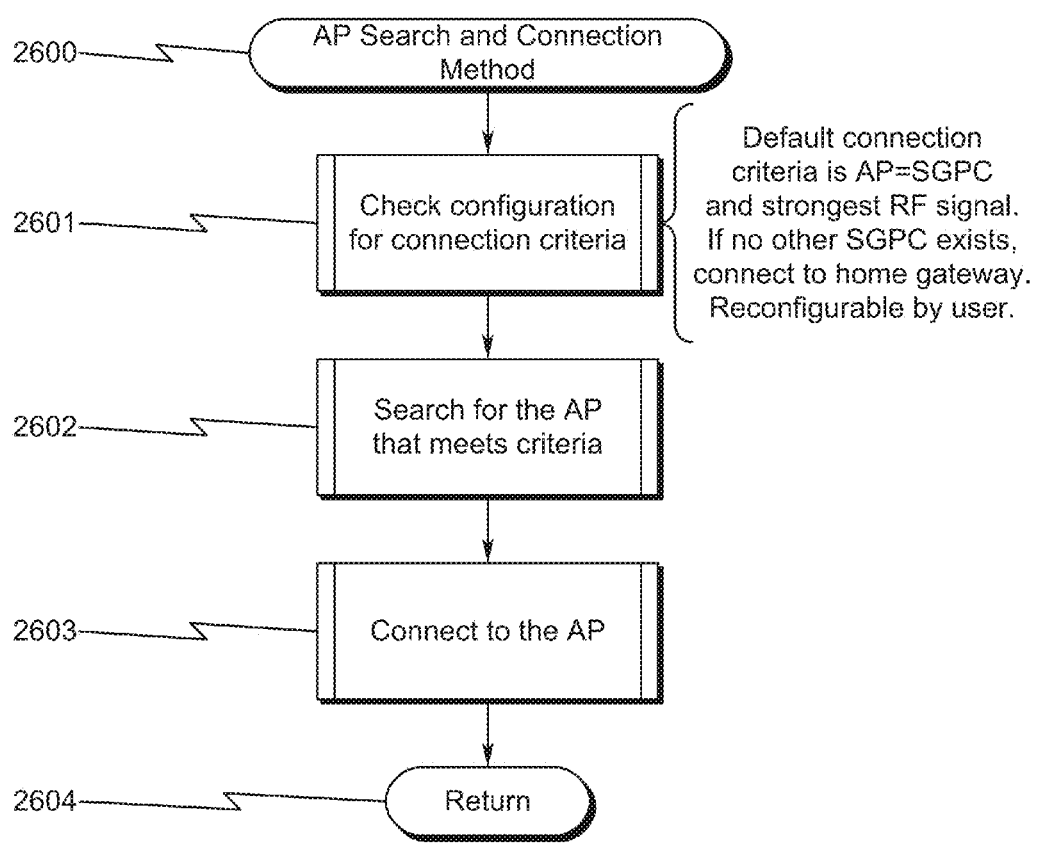
FIG. 26 illustrates an exemplary AP search and connection methodology flowchart useful in some preferred embodiments of the present invention.

A generalized search and connection method useful in some preferred invention embodiments to form the tree like network structure described above is generally illustrated in FIG. 26 (2600).

Scenario 2 (Adaptive Network)

Once all deployed SGPCs form a network as in scenario 1, the inter-connection between SGPCs can be adjusted/reconfigured when consumers start to configure SGPCs for controlling and monitoring home devices, or certain events happen, such as a SGPC is not responsive.

Case 1

The currently connected SGPC is no longer responding or the response is slow, meaning the SGPC may be broken, busy or the traffic to/from is too heavy, therefore a new AP needs to be found.

Case 2

Assume SGPC1 in FIG. 18 (1800) controls a TV, and SGPC2 controls a light. Consumer can configure SGPC1 and SGPC2 based on this simple rule:

If SGPC1 is switch on (TV is on), then SGPC2 is turned off if it is on.

In this case, if SGPC1 and SGPC2 are not already in the same subnet, they would be put into the same subnet to improve the performance.

Case 3

Assume SGPC2 controls an air conditioner, the ZIGBEE® network associated with SGPC1 contains a ZIGBEE® sensor measures the room temperature (see FIG. 18 (1800)). Suppose the consumer configures the SGPC2 such that its control action depends on the measurement of the sensor. If SGPC1 and SGPC2 are not already in the same subnet, they are put into the same subnet.

Figure 22:
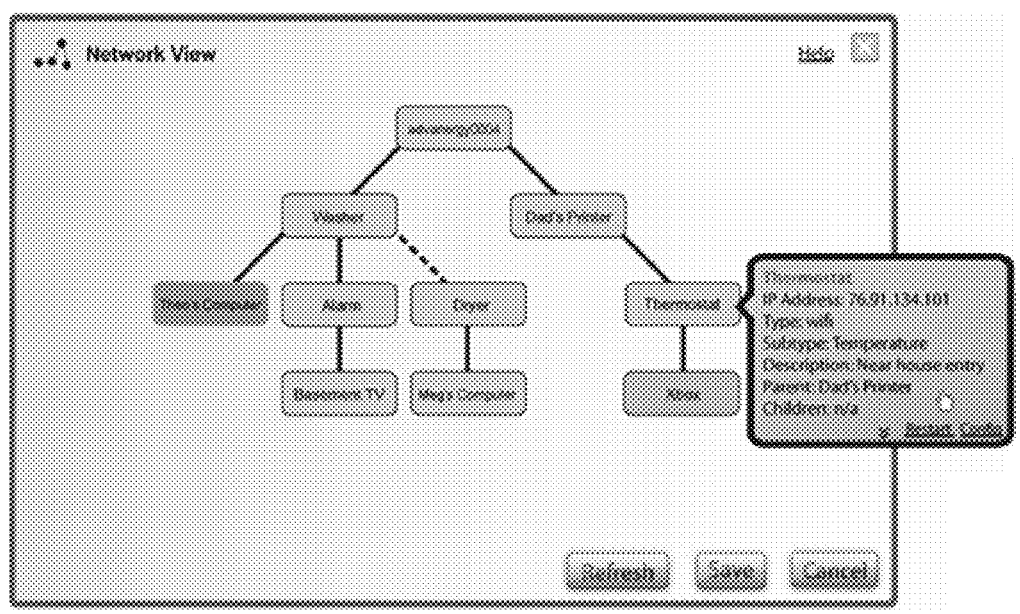
FIG. 22 illustrates an exemplary network view of a typical home automation network using the teachings of the present invention.

Rule definitions that associate a control action with measurements or data from another device are discussed in the Provisional Application for POWER CONTROL SYSTEM AND METHOD referenced above. As the network is reconnected, the UI as generally illustrated in FIG. 22 (2200) will typically reflect the network changes in real-time.

AP Reconnection Method (2700)

Figure 27:
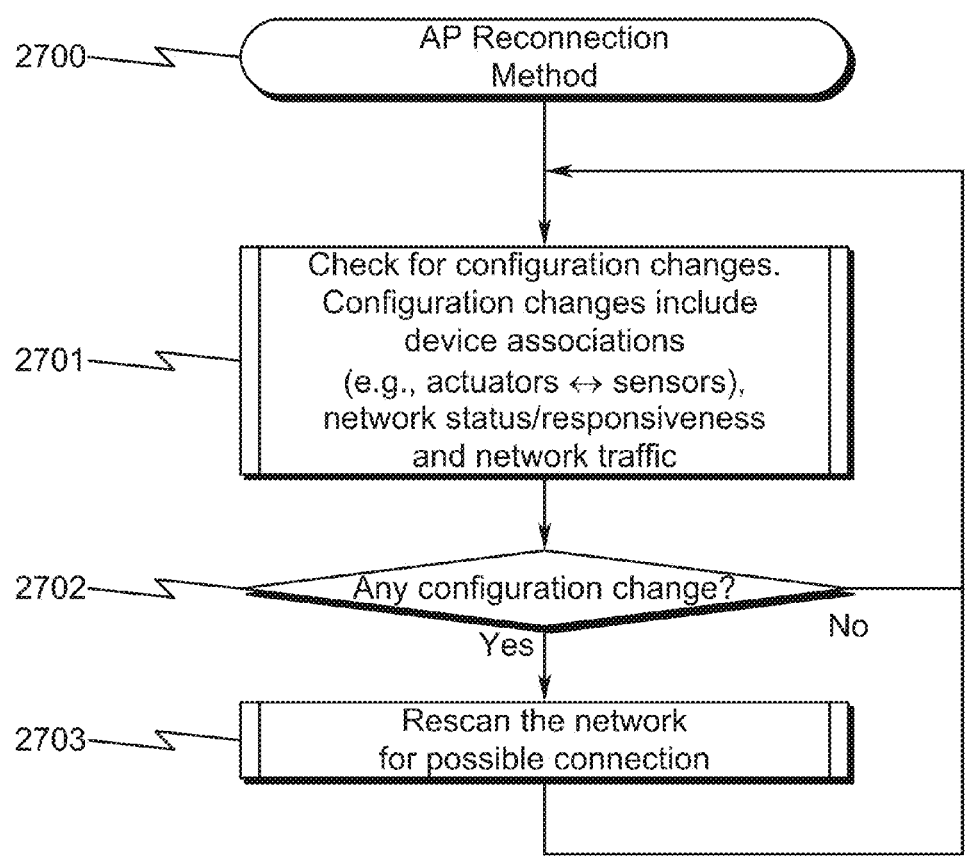
FIG. 27 illustrates an exemplary AP reconnection methodology flowchart useful in some preferred embodiments of the present invention.

A generalized AP reconnection method useful in some preferred invention embodiments to reconfigure the network structure described above is generally illustrated in FIG. 27 (2700).

Scenario 3 (Manually-Formed Network)

Figure 23:
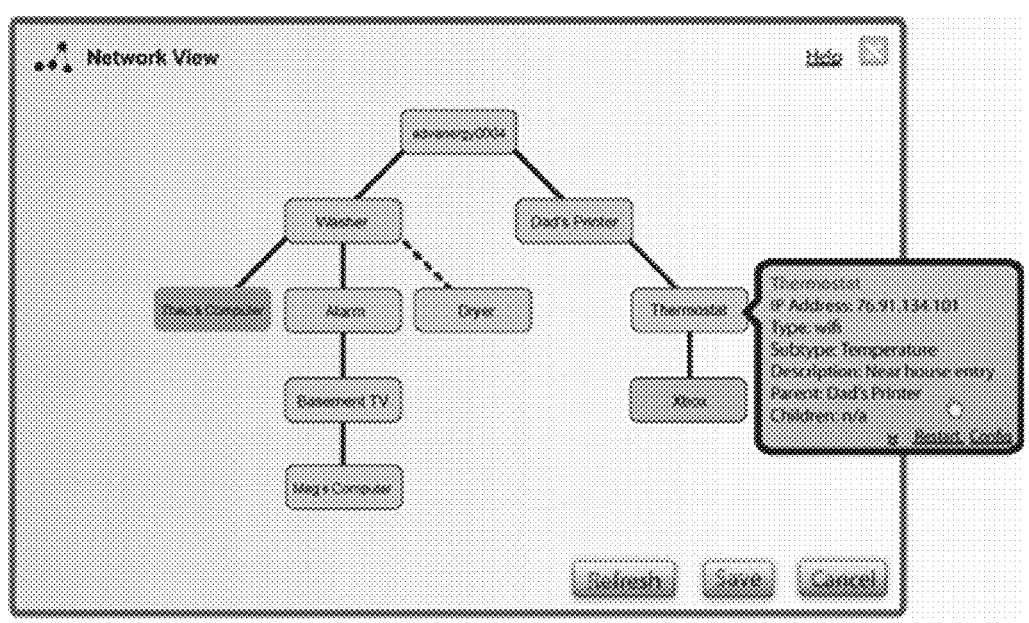
FIG. 23 illustrates an exemplary network reconnection scenario within a home automation network where a device can be reconnected (compared with FIG. 22 (2200)) using the teachings of the present invention.

Consumers can manually reconfigure who connects who for an established network. This is done simply by reconnecting the nodes in a tree, as illustrated in FIG. 23 (2300), where node "Meg's computer" is now connected to "Basement TV" after disconnected from "Dryer" (compare with FIG. 22 (2200)). Here the names are "nicknames" assigned to a node to help identify/remember the functionality of a HA device.

The scan and discovery of a HA device to connect to is part of a wireless device PHY/MAC layer capability and not detailed herein, as this functionality is application specific to the wireless interface used and well within the implementation capability and discretion of one of ordinary skill in the art. The network connection information—the tree structure—is optimally presented in XML format. The information is broadcast among the SGPCs and is used by UI.

Every SGPC broadcasts its own node information to the network at initialization and every time a reconnection is done, as shown below. The node information includes node name, type, description, and the AP (parent) connected and clients (children). A typical format for this is provided below:

```
<node>
    <name> CompanyID100-001 </name>
    <type> WiFi <\type>
    <nickname> Basement TV <\nickname>
    <description> Samsung LED TV </description>
    <parent> Home Gateway (192.168.1.1) </parent>
    <child> CompanyID100-002 </child>
    <child> CompanyID100-005 </child>
<\node>
```

Each SGPC may store the information on all the nodes it received as in the following example:

```
<netConfigure>
    <node>
        <name> CompanyID100-001 </name>
        <type> WiFi <\type>
        <nickname> Basement TV <\nickname>
        <description> Samsung LED TV </description>
        <parent> Home Gateway (192.168.1.1) </parent>
        <child> CompanyID100-002 </child>
        <child> CompanyID100-005 </child>
    <\node>
    <node>
        <name> CompanyID100-002 </name>
        <type> WiFi <\type>
        <nickname> Air conditioner <\nickname>
        <description> A/C in bedroom </description>
        <parent> CompanyID100-001 </parent>
        <child> XYZ-004-01 </child>
    <\node>
    <node>
        <name> CompanyID100-005 </name>
        <type> WiFi <\type>
        <nickname> Light <\nickname>
        <description> Bedroom light </description>
        <parent> CompanyID100-001 </parent>
    </node>
    <node>
        <name> XYZ-004-01 </name>
        <type> ZIGBEE <\type>
        <nickname> Basement TV <\nickname>
        <description> Temp sensor </ description>
        <parent> CompanyID100-001 </parent>
    <node>
</netConfig>
```

Reference FIG. 22 (2200) for an example of tree like network connection.

Information Exchange Between SGPCs

Once the SGPCs and non-WiFi device are networked, they can exchange information. There are two preferred types of SGPCs and non-WiFi HA devices: actuators and sensors. Actuators are devices that can exert actions, such as switching and regulating. Sensors are devices that measure physical and chemical variables, such as temperature, pressure, and electricity. Actuators can take actions based on measurements of any sensors.

SGPCs can combine both actuators and sensors in one unit. But the communication between them is generally considered an internal SGPC function and in most case not involved with inter-networking capabilities between HA devices.

It is important for the HA devices (WiFi based and non-WiFi based) to exchange a set of messages in order to work together. The purpose of exchanging information is twofold:

It is important for actuators to know the data/measurement from another device, if the action of one actuator depends on the data/measurement of another; and As discussed later, consumers can see the information on all devices when they are connected with one of the devices.

Initial Capability Information Exchange (ICI)

When HA devices first form a network, they exchange certain information on their capabilities. This information is broadcast among the HA devices. The capability information may include, but not limited to the following:

Type of HA Device

HA device types may typically include but are not limited to actuators, sensor, or combo (with both actuator and sensor).

Sub-Type of HA Device

For an actuator, the sub-types may include:
what sub-type it is—a switch or regulation on what variables (e.g., electricity, water, etc.);
what sensor data its control action is based on.

For sensors, the sub-types may include:
what sub-type it is in terms of what measurements it collects—temperature, pressure, etc.

The present invention anticipates a standardized set of HA types and sub-types as detailed in the following exemplary table that lists a subset of this standardized type/sub-type sets.

| Type | Subtype | Control variable/ data available | Dependency to other device | Description |
|---|---|---|---|---|
| actuator | Switch | On/off | | Actuator status and Sensor data (same for below types) |
| | Regulator | Reference/ control value, lower and upper limit | | Regulator keeps a value (e.g., temperature) at a certain reference point, with lower and up point, beyond which alert events will be generated |
| | Motor | On/off, Speed | | Window opener, door opener |
| | Alarm/ buzzer | On/off | | |
| Sensor | Temperature | Temperature | | |
| | Electricity meter | Watt, kilo-watt-hour | | |
| | Water meter | ACM/h (actual cubic meters per hour) | | |
| | Gas meter | Liters per second | | |
| | Camera | Video | | |
| | Motion sensor | Movement detected | | |
| | Air quality detector | Dust percentage | | |

This capability information is exchanged once during the device's runtime—defined as the time between it is powered up and the time is powered down or goes into a bad state. This information is general termed initial capability information (ICI) exchange. Once a HA device gets the ICI from another HA device, it knows what information it can get from that HA device.

The ICI may be presented in XML as detailed below:

```
<intialMesg>
    <name> CompanyID100-001 </name>
    <type> actuator </type>
```

-continued

```
    <subtype> switch </subtype>
    <description> any text here </description>
</initialMesg>
<initialMesg>
    <name> xyz100-001 </name>
    <type> sensor </type>
    <subtype> temperature </subtype>
    <description> any text here </description>
</initialMesg>
```

The name part of the message is the name of the node. The name is used for cross reference between the network view and functional view (the two views will be discussed in details below).

Runtime Information (RI) Exchange

During the run time, HA devices may exchange the following information:

Requests to subscribe status, events and measurements (one time, periodic, events);
For actuators, status of a switch and regulator in response to requests;
For sensors, the measurements of a sensor over a period of time in response to requests;
The pending action scheduled of actuators; and
Events happened on actuators and sensors.

Figure 28:
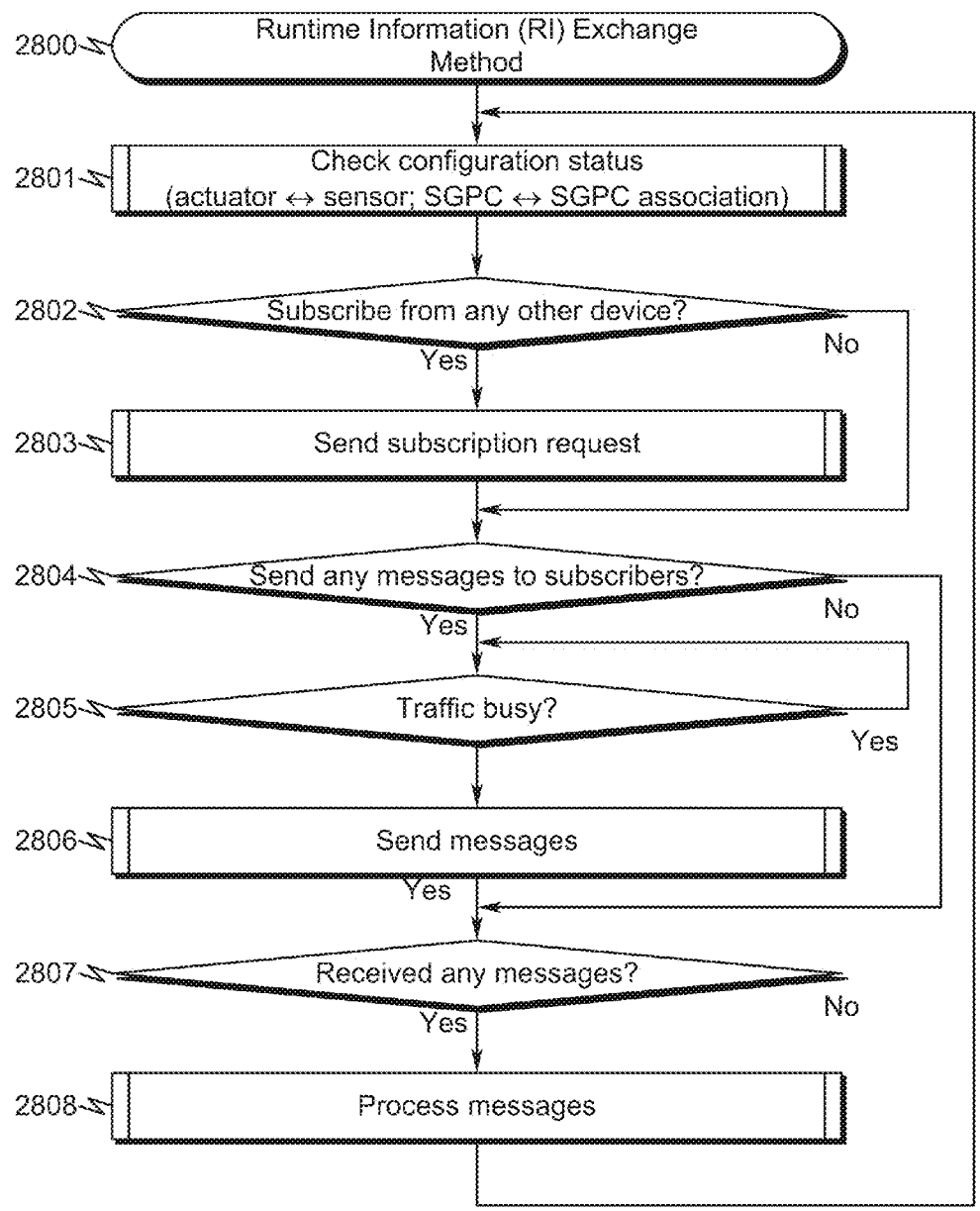
FIG. 28 illustrates an exemplary runtime information (RI) exchange methodology flowchart useful in some preferred embodiments of the present invention.

The RI exchange can be one time, periodic with a given a period, and event-driven. FIG. 28 (2800) illustrates an exemplary flowchart depicting how runtime information (RI) is exchanged among various SGPC devices.

RI Implementation

An exemplary RI implementation may include the following:

The information is carried in XML format. The following are samples of the XML messages.

Adaptive traffic rate control. When to send RI can be controlled based on the current traffic. If the traffic is busy, the "scheduled" RI exchange can be delayed a little to a time when the traffic is light.

EXAMPLES

The following example illustrates the RI functionality as depicted in XML format for a situation in which Node "CompanyID100-003" subscribes from Node "CompanyID100-001":

```
<runtimeMesg>
    <type> Subscribe </type>
    <from> CompanyID100-001 </from>
    <dataType> switchStatus </dataType>
    <!-other available data types:
    sensorData, regulatorStatus, connectionChange -->
    <frequency> onetime <\frequency>
</runtimeMesg>
Node "CompanyID100-001" responds to
Node CompanyID100-003:
<runtimeMesg>
    <type> response </type>
    <to> CompanyID100-003 </to>
    <dataType> switchStatus </dataType>
    <data>open <\data>
</runtimeMesg>
More examples of responses:
<runtimeMesg>
    <type> response </type>
    <to> CompanyID100-001 </to>
```

```
            <dataType> sensorData </dataType>
            <data> 98 <\data>
            <dataUnit> C-degree <\dataUnit>
        </runtimeMesg>
        <runtimeMesg>
            <type> response </type>
            <to> all </to>
            <dataType> connectionChange </dataType>
            <parent> CompanyID100-002 </parent>
            <child> CompanyID100-002 </child>
            <child> CompanyID100-005 </child>
        </runtimeMesg>
        <runtimeMesg>
            <type> response </type>
            <to> CompanyID100-003 </to>
            <dataType> regulatorStatus </dataType>
            <regulateVariable> temperature </regulateVariable>
            <referenceValue> 75 <\referenceValue>
            <referenceValueUnit> C-degree<\referenceValueUnit>
        </runtimeMesg>
```

Consumer-SGPC Interactions

Consumers interact with the home automation system—the network of HA devices (SGPCs and their companion devices)—in various modes. While the present invention anticipates a variety of consumer/SGPC interaction modes may be supported in any particular embodiment, the following four modes are specifically anticipated as being optimal in many preferred embodiments:

Mode 1: Web Page Hosted on a SGPC

Consumers directly interact with the web server hosted on a SGPC. There is one unique feature of the web server:

Consumers only need to connect to one of the SGPC to get the information of all SGPC on the server.

This feature of connecting to one SGPC and get all the information is supported by the fact that all SGPCs exchange information on a regular basis or on-demand.

This feature is in contrast to some existing user interfaces where an application on consumers' device must communicate with every HA device to get its information. Or a proxy server must do so for the consumers so that the consumer device can communicate with the server to get the information.

Within this mode, there are two anticipated methods of implementing this functionality:

Centered Web Page

All the information a consumer wants to know—information on the connected HA device or that of other HA devices—comes from the database of the connected HA device. The connected HA device gather the information form other HA device through the RI exchange discussed before.

Distributed Web Page

When a consumer wants to get the information from another HA device, the connected HA device simple route the request to the target HA device and redirect to the web page on that HA device. The consumer device does not need to reconnect to another device as it is still connected to the first device, just the web page on the second device now is routed through the first device.

Implementation: To use this mode, a consumer's device must have the access information on the SGPC to be connected. This happens in two cases: (1) when the device is in the vicinity of the SGPC using WiFi communication; and (2) when the device is outside home using Internet to get connected. The first case is a standard function of a WiFi device.

In the second case, the consumer devices must have the IP aggressing information of the SGPC. How consumer devices obtain the IP addressing information is discussed below.

Internet Proxy Server as a Yellow Book

When the consumer is outside the home, she must use Internet to communicate with the SGPC. If a consumer (or consumer device rather) does not have the access information of the SGPC, it contact a proxy server on the Internet (e.g., www.CompanyID.com). The proxy server serves as a yellow book as it is in a constant "maintenance" mode to communicate with a SPGA to update the SGPA's address information in its database.

The details on how the proxy server gets and keeps the addressing information of SGPCs is detailed in the Provisional Patent Application for POWER CONTROL SYSTEM AND METHOD referenced above.

When the consumer device contacts the proxy server, it logs in to the consumer's account, and the access information of all the SGPCs in her home is right there in the web page of her account. After clicking the address link of a particular SGPA, the consumer device is in direct communication with the SGPA. Example of the link to the addressing info:

http://www,CompanyID.net/homeautomation/xyz1023/sgpc_001 where xyz1023 is the username of the home owner, and sgpc_001 is the name of a particular SGPC. This link directs a user to the web page of a SGPC at home.

The proxy server not only maintains the addressing information of the SGPCs, it also maintains the addressing information of the consumer devices. The mechanism to maintain the addressing information of consumer devices is the same as that for SGPCs. As a result, not only consumer device can get the addressing information of SGPCs and can initiate communication with the latter, the latter can initiate communication with the former as well. The "reverse" initiation is necessary when SGPC wants to push information into consumer devices, to be discussed later.

Mode 2: Proxy Server Hosted Web Server

SGPCs send all the information it would present on their own web pages to a proxy server, which stores the information in its database, and presents the web pages on its own web server. This mode is commonly used today for interaction between consumers and home devices. The advantage of this mode is that a web server is not needed as a yellow book. The disadvantage is that consumers do not trust a third party where their information is stored.

Mode 3: Application Based

Consumer can download an application to her device, an iPhone® or other mobile device for example. The application does one or all of the following:

Background Proxy Server. It has a small proxy server running in the background, which does the same as the Internet proxy server described before—in a regular interaction with the home SGPCs and updates the SGPC access information in its database. With this background proxy server, consumers need no intermediate Internet servers to provide addressing information, in contrast to the requirements currently imposed by the prior art. This device based proxy server is different from an Internet proxy server in that it is only interested in owner's home SGPAs, while the Internet proxy server maintains addressing information for many homes' HA devices. This functionality may be implemented as follows. If the consumer devices are powered off, than the proxy server will lose connection with SGPCs. In the case, when the consumer device is powered up again, the proxy server must first contact the Internet proxy server to "bootstrap"—get the updated SGPC addressing information (its old addressing information may be stale). So the Internet proxy server is not dispensable. But after the bootstrap, the small proxy server will maintain the IP addressing information by regularly communicating with the home devices the same way an Internet proxy server does.

Constant Proxy Server Updates. It communicates with the Internet proxy server constantly to update its own addressing Information just like a SGPC does (see Mode 1). As a result, when a SGPC wants to notify a consumer of an event (see the Mode 4: Push information to consumer), it contacts the internet proxy server and gets the addressing information of the consumer device.

SGPC Interaction. It interacts with the SGPCs and gathers the information and present in a user interface running on the consumer device. The UI can be customized to fit the owner's taste. This application can talk to one SGPC or multiple SGPC at the same time.

Mode 4: Push Information to Consumer

When a consumer device registers itself to a SGPC to receive push information or notification, their device can receive status change, events, or measurement in their email or text messages. While a consumer can register on more than one SGPC, it is not necessary since one SGPC can get the data from other SGPC for the consumer.

In addition to the email and text messages, the SGPC can find the addressing information of a smartphone from the Internet proxy server. When the consumer turns on the application on the iPhone®, tablet, or other mobile device, the SGPC detects that the registered device is on, and starts to stream data to the consumer device. The application on the consumer devices may pop up windows displaying these events.

The reason the SGPC knows an IPhone® is on is that the small device based proxy server mentioned in Mode 3 regularly communicates with the SGPC when it is on.

With these four modes, consumer devices and home HA network form a type of man-machine "social" network. They are constantly in touch with each other, sending and pushing information to each other.

Home Based Web Server Content

A SGPC contains a web server for a home, and can be personalized in terms of the house location, the house income, the energy usage and controlled house electronics device. The web server is unique in the sense that it is dedicated to a home and is different from an Internet hosted server where the information has to be uploaded and the web pages dedicated to a consumer share the same server with others. Besides the security and privacy issue of the Internet hosting server, it is difficult for a third party to target services to a consumer or their home. The present invention allows the "home" web page to be personalized with supplementary information on the web server. Within this context the home based web server acts as a "smart digital TV" at home, where targeted information can be delivered.

The user interface, either the web page hosted on SGPC or the UI running on consumer devices, is primarily responsible for presenting the home automation information and allows consumers to control and configure HA devices and monitor the measurements.

In addition to the home automation information, the present invention may provide the following supplemental content:

Web Banner

Web banners may be provided by web servers hosted on SGPCs and/or Internet proxy server. Web banners are anticipated to be added to web pages and streamed to consumers in at least two cases.

Scenario 1 (Waiting for Connection)

There are pauses when consumers try to connect to a SGPC via a proxy server. The pauses provide a short window to put out the web banner on screen.

Internet proxy server or device based proxy server monitors the latency from the moment a consumer click a SGPC to get connected to the moment the connection is established and the SGPC web page shows up. During this "waiting" window, SGPC puts on web banner with the content described below.

When the web page from the connected SGPC shows up, there are two typical cases configurable by consumers or proxy server manager. One case is that web banner stops when the SGPC web page shows up. The other case is that the banner will continue, blending into the new web page in the normal interaction between the consumers and the SGPC (see below).

Scenario 2 (Interaction with SGPCs)

When consumer interacts with a SFPC in one of the 4 modes discussed above, web banner can come as a continuation of that during the connection "pause", or as independent one.

Web Banner Content Delivery Method (2900)

Figure 29:
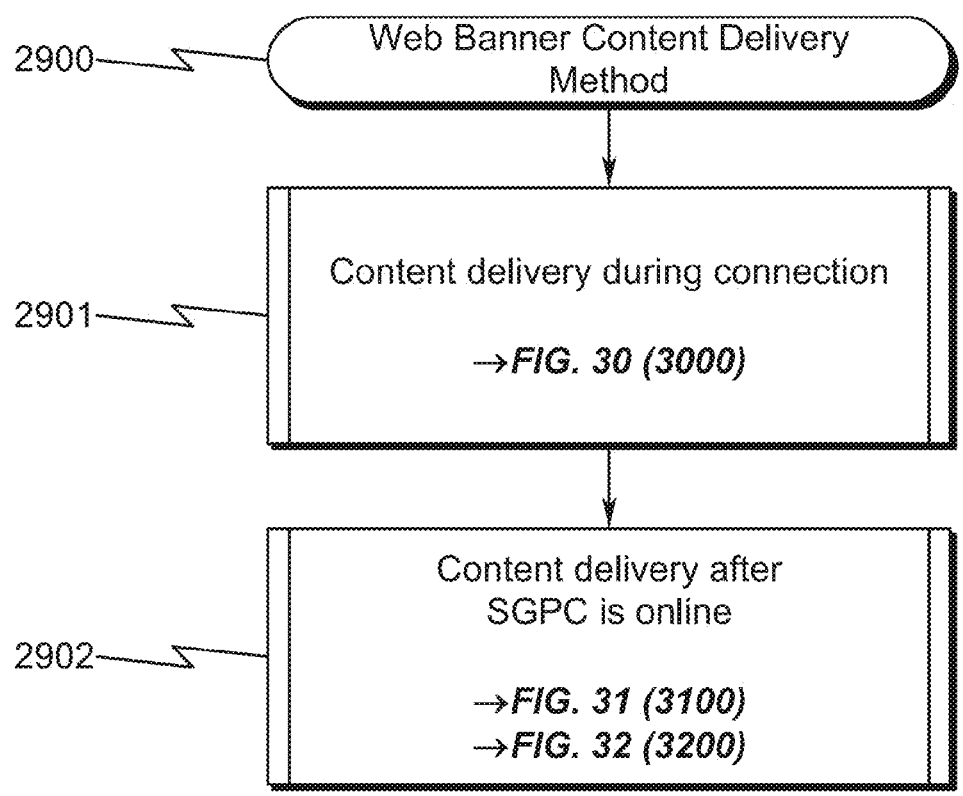
FIG. 29 illustrates an exemplary web banner content delivery overview methodology flowchart useful in some preferred embodiments of the present invention.

A generalized web banner content delivery method useful in some preferred invention embodiments that depicts the overall web banner content delivery process, taking into consideration of the two scenarios discussed above is generally illustrated in FIG. 29 (2900).

Content Delivery Mechanism (1900, 2000, 2100)

Web banner content on the SGPC web server is either come from local storage or from real-time "streaming" from an Internet server. An Internet web server dedicated to serving home based web content (usually the same server as the proxy server), will stream content targeted to each home, much in the same way as Internet TV or video-on-demand streamed into home. The difference is that the content is to be displayed in the banner of the web page hosted in the always-on SGPC or HA devices.

The web server, herein termed a home-bound content (HBC) server, typically comprises the following:

A backend database with information on the profile of each home and the associated content to send to each individual home A scheduler that manages the content to be delivered to homes by updating the database A front-end interface that "detects" if the web pages of a SGPC are alive (meaning the SGPC device is connected with a consumer device and the web page opened) or otherwise—idle. The front-end communicates with the software on the SGPC to detect this.

A delivery server that interacts with the database and the frontend, and deliver the content The HBC server typically sends/streams banner content, including data and video clips to a SGPC, in the following cases:

When the SGPC request the content. The SPGC software may send a request for web banner content along with what type of content to get, depending on the current interaction context with the users (see the discussion below).

When the web pages on the SGPC is alive, push the content to SGPC (unsolicited).

At a given time when the traffic is slow, for example, during mid-night, regardless whether the SGPC is alive or a content request is received.

In the first two cases listed above, the content is displayed real-time on the web banner whereas in the third case the content is stored in the local storage of the SGPC for later use.

Figure 19:
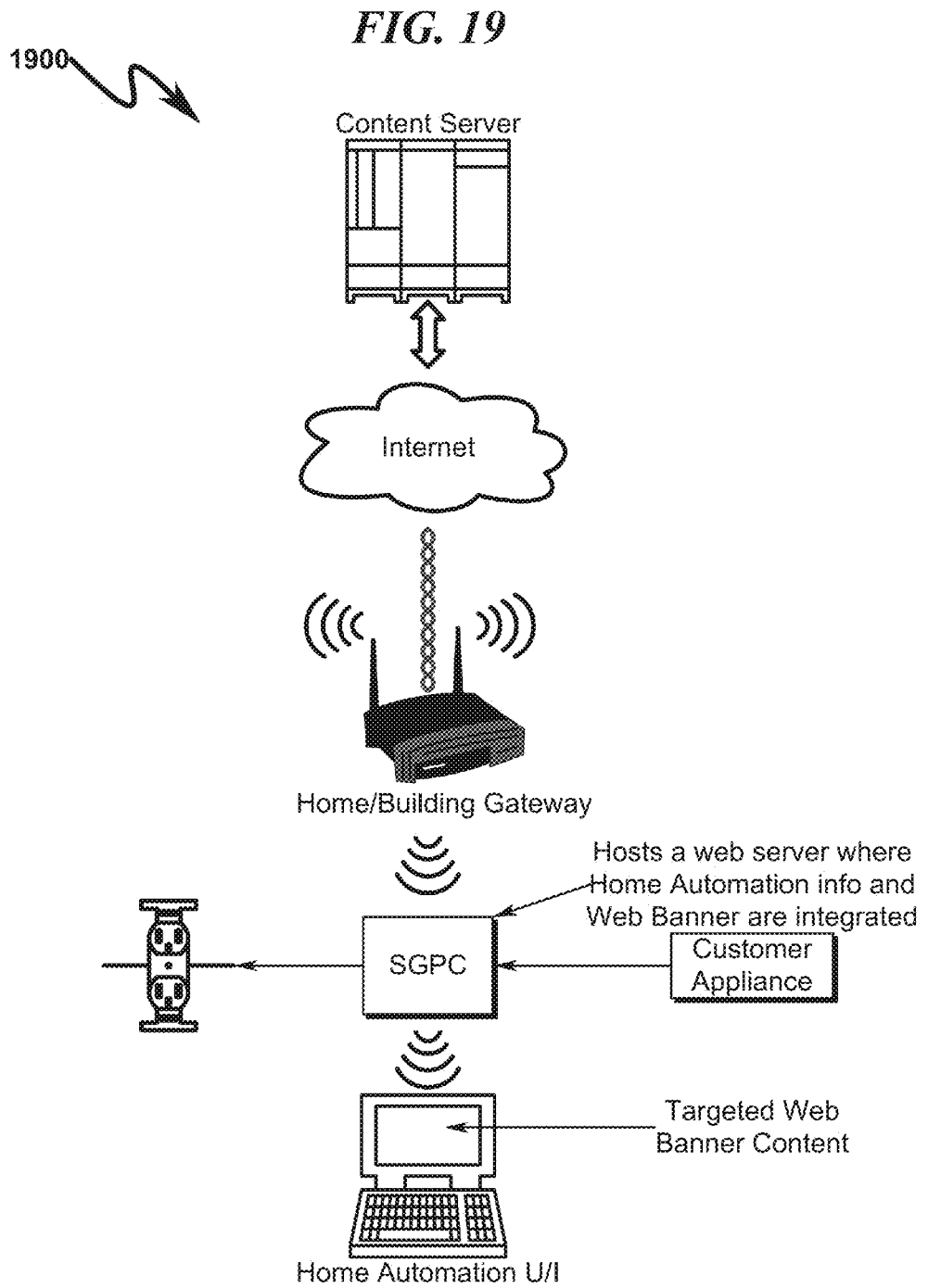
FIG. 19 illustrates an exemplary application context of the present invention in which home automation information and web banners are integrated within a home automation network.
Figure 20:
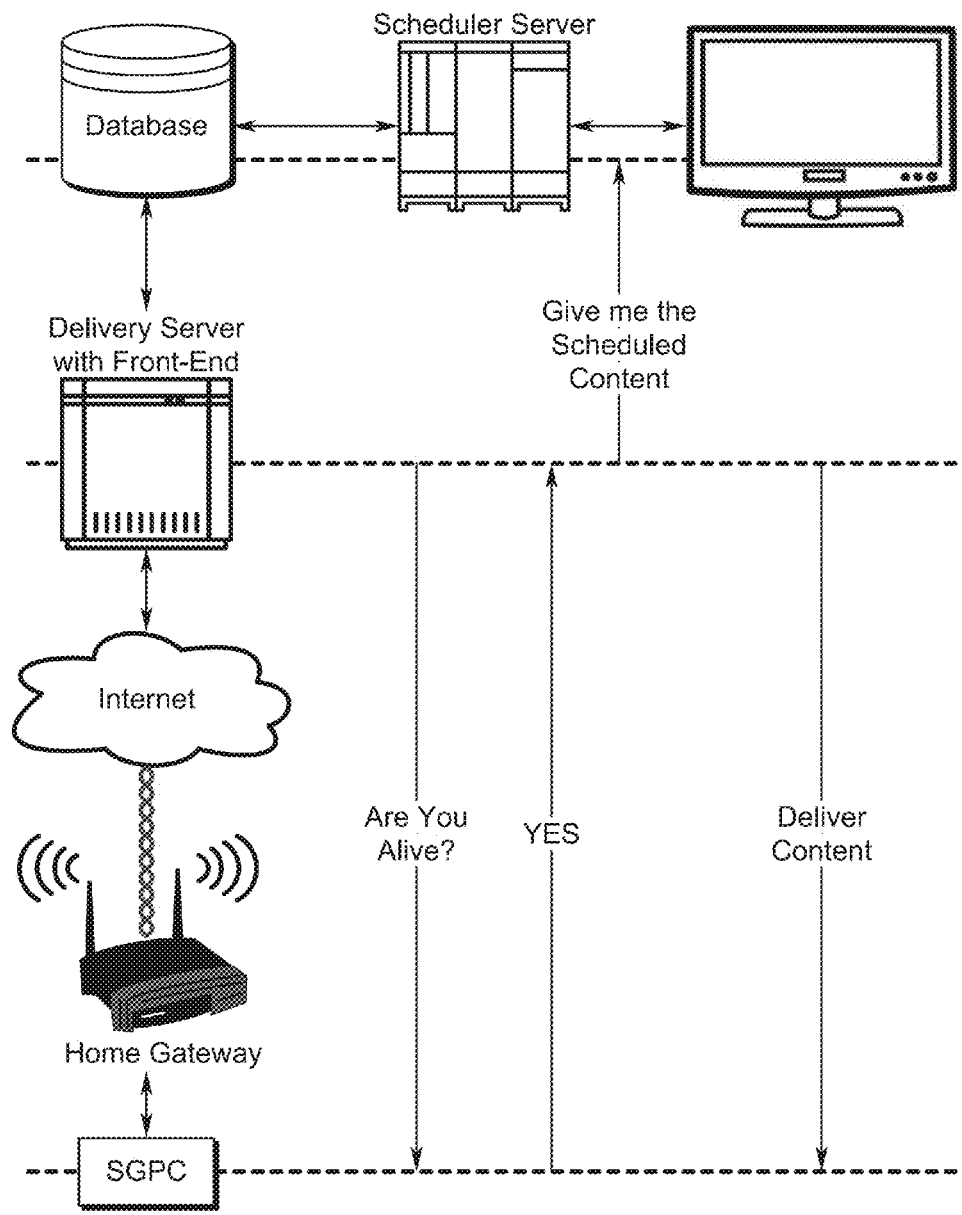
FIG. 20 illustrates an exemplary application context of the present invention in which scheduled content is delivered to a home automation network.
Figure 21:
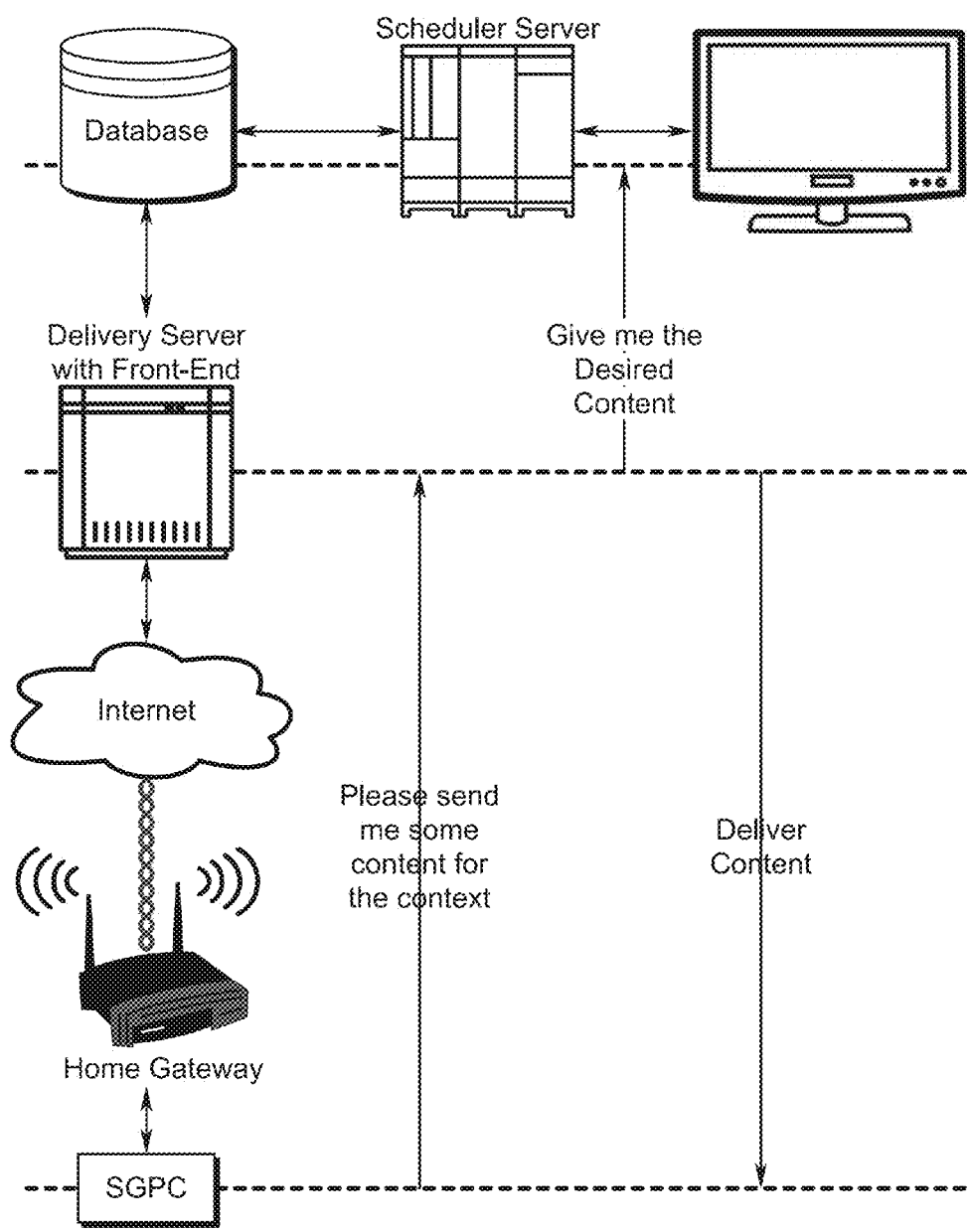
FIG. 21 illustrates an exemplary application context of the present invention in which scheduled content is delivered to a home automation network based on device context.

FIG. 19 (1900) generally depicts a HBC server connected with a SGPC. FIG. 20 (2000) generally illustrates how the content is pushed to SGPC and FIG. 21 (2100) illustrates how content is pulled from SGPC.

Web Banner Content Delivery Methods (3000,3100,3200)

Figure 30:
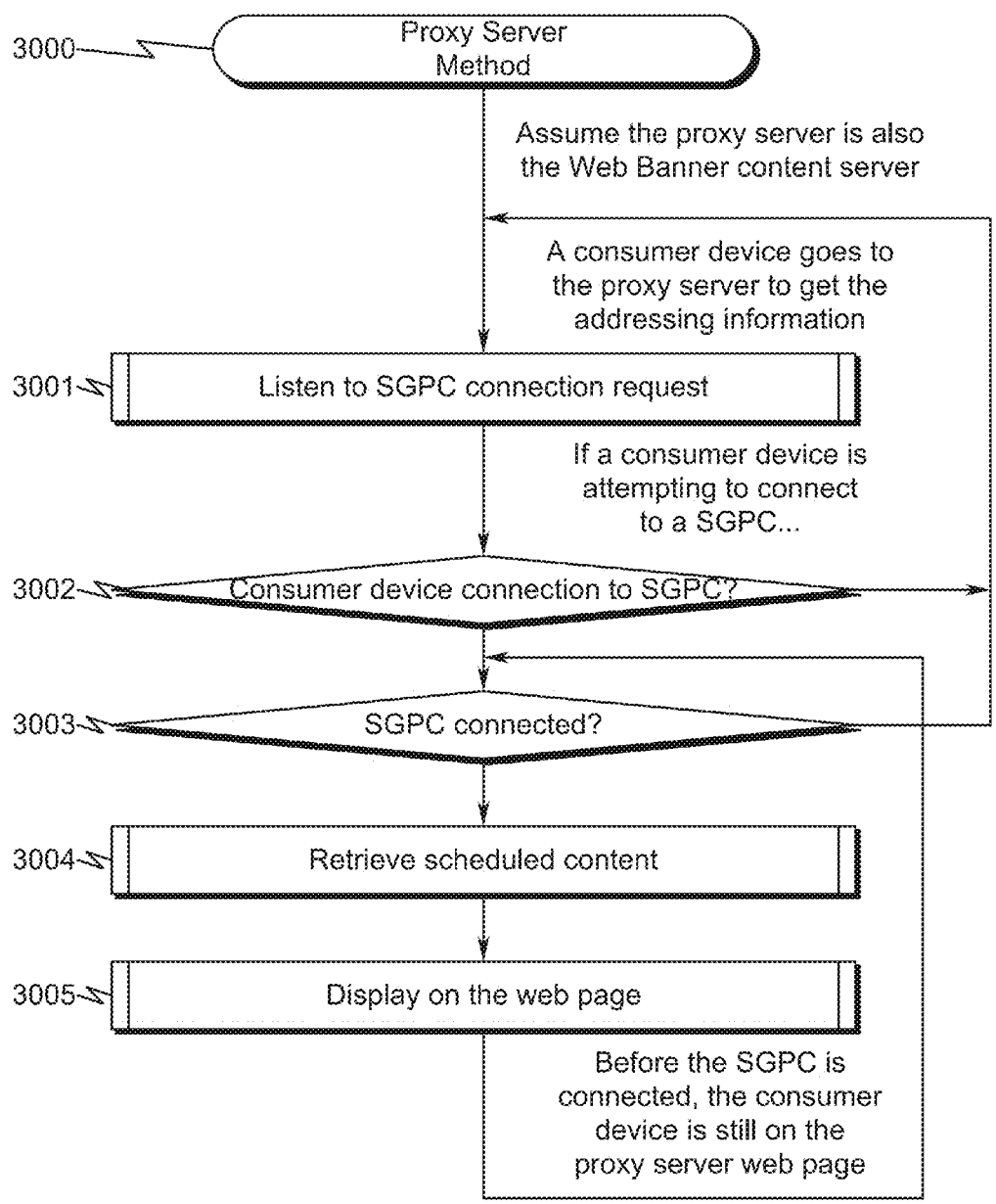
FIG. 30 illustrates an exemplary banner content delivery during connection pause window methodology flowchart useful in some preferred embodiments of the present invention.

A generalized web banner content delivery method for the Scenario 1 (delivery into the pause window during the connection) useful in some preferred invention embodiments is generally illustrated in FIG. 30 (3000).

Figure 31:
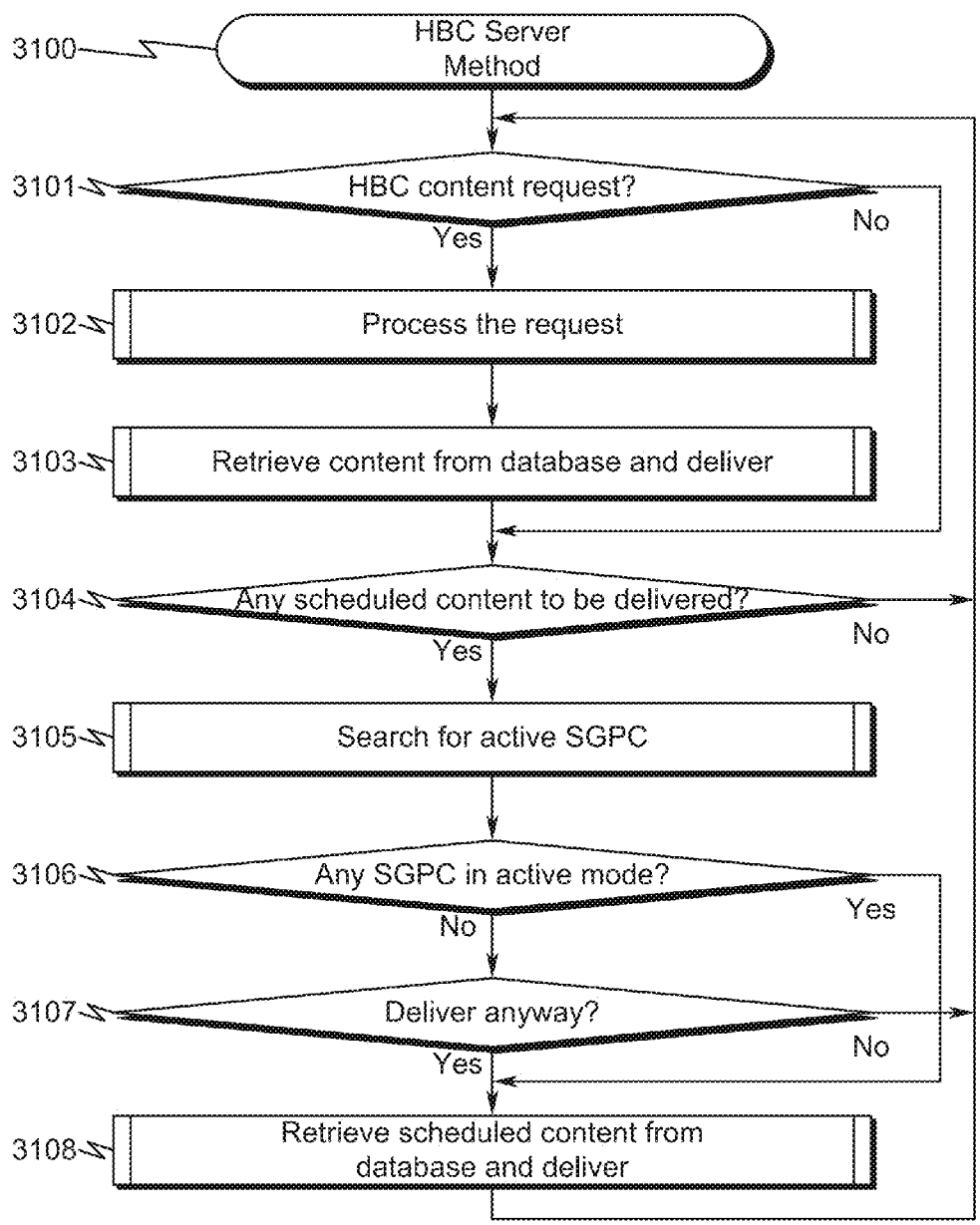
FIG. 31 illustrates an exemplary web banner content delivery of HBC server methodology flowchart useful in some preferred embodiments of the present invention.
Figure 32:
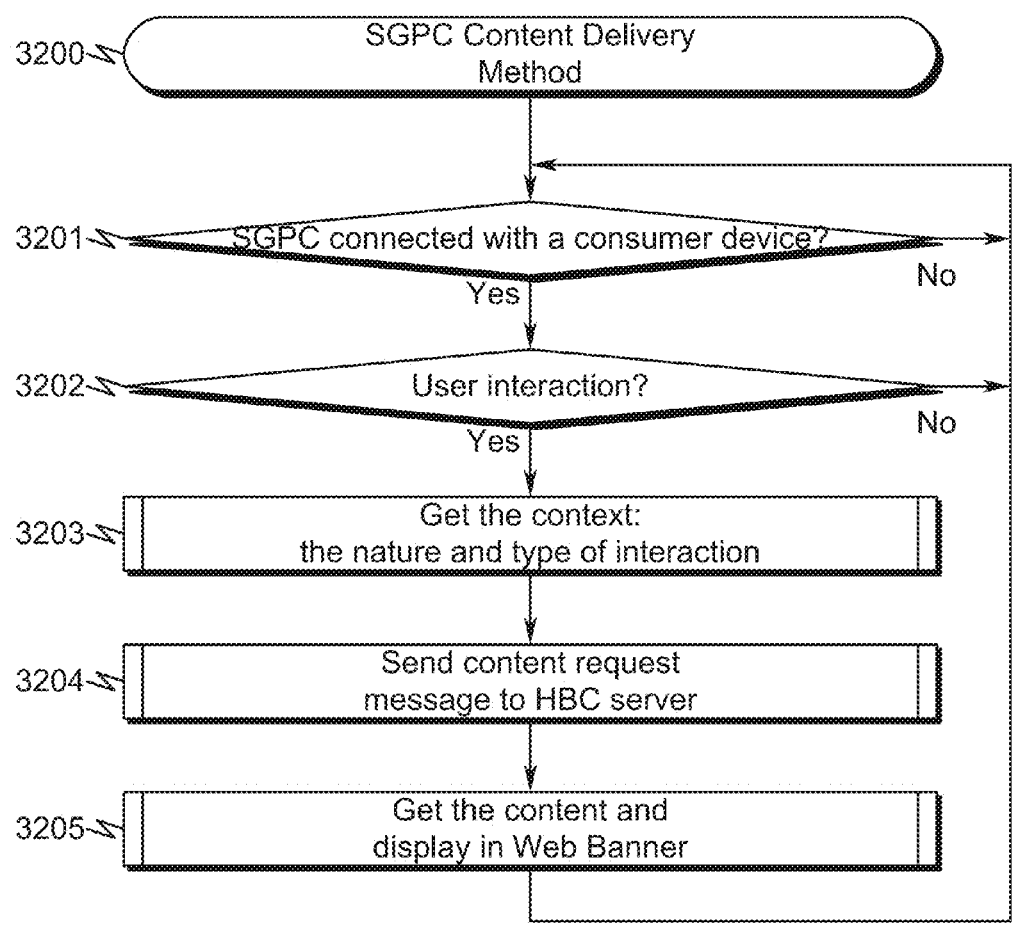
FIG. 32 illustrates an exemplary web banner content delivery (SGPC side) methodology flowchart useful in some preferred embodiments of the present invention.

The flowcharts depicted in FIG. 31 (3100) and FIG. 32 (3200) illustrate the processes of the content delivery during the normal operation of SGPC. The flowchart of FIG. 31 (3100) illustrates the process of content delivery on the HBC server side, and the flowchart of FIG. 32 (3200) illustrates the process of the content delivery on the SGPC side.

It should be noted that a SGPC typically sends content requests to HBC server with the context of the interactions with consumers. The context of the interaction may include:
the device involved;
the action taken;
the data read;
the location of the device; and
other related information.

Based on the information, the HBC server can select content targeting the context. One way to implement it is for the scheduler of the HBC server and SGPC software to define types of context and the content types/genres, and associate context types with content types in the database, and select content in real time according to the context type. Application examples of this content targeting are detailed below.

Content

The web banner may include the following supplementary information:

Close-Loop Advertising

The definition of close-loop advertising is that the advertising is related to the location of the SGPC and context of the interaction with home automation functionality (the information relates directly to the device being currently monitored and controlled). Web links are embedded in the web banners for purchasing or more information.

Examples of this may include:

When the consumer looks at the status and energy consumption of a light, information about energy-saving light bulbs can appear in the banner enabling the consumer to instantly have comparison with the current light bulbs in use;

When the web page shows a significant usage of certain electronic devices, certain advertisement from local utility companies and stores on similar devices and services with energy-saving features can be posted.

Local Commercials and News

Like what is shown on some TV channels, this gives general purpose local commercial advertisements and news. The advertisements and news are local and targeted to a well-defined community/house hold. For example, Base on the time of day, food advertisement from local stores can be posted.

Instant Energy Usage Analysis and Energy Saving Suggestions

From time to time, suggestions and web links on how to save energy appear on the web banner. Examples of this may include:

When too many lights are on or too many TVs are on, a friendly reminder will pop up in the banner to turn off some lights;

The total home energy and histograms of some devices will roll over the banner

User Interface

When a consumer device is connected with a SGPC, a web page can be opened on the SGPC. Consumers may either control and monitor that SGPC and/or control and monitor other SGPCs via the connected SGPC. The present invention anticipates at least two views of the user interface in this context.

Functional Views

Provisional Patent Application for POWER CONTROL SYSTEM AND METHOD as incorporated herein has discussed the functional view. This view is for users to perform home automation configuration and monitor home automation device status. This functionality is summarized here without further detail. The functional view contains the following information:

For actuators, the view allows users to check the status of actuator, schedule and configure actions of actuators. The control action can be scheduled one time only or periodic.

For sensors, the view displays the sensor measurement such as energy consumption. The measurement can take the format of tabular display, or histogram, and can be zoomed in and out.

Additionally, the viewer allows users to associate an actuator action with another other actuator status and sensor data, and register for event notifications to be sent to their email or smartphones, and download applications.

Network View

This view shows the tree structure of home automation network discussed before, as generally illustrated in FIG. 22 (2200). The view includes node connections, node properties—IP address, wireless interface (WiFi, ZIGBEE®, etc.), etc. This is for system diagnostic purposes and for advanced user control. In most cases, consumers are interested in the functional view only.

In this view, all the nodes a SGPC can detect will show along with their connections with each other. The view shows the status of each node—live (connected with user, green color), standby/idle (running but not connected with a user, yellow color), out-of-service (in a bad state, may need service, red color). For example, as generally depicted in FIG. 22 (2200), node "washer" is in active mode, node "Xbox" is idle, and node "Theo's Computer" is currently down.

The network view will automatically refresh periodically to reflect the updated network connections. Users can press the "Refresh" button to manually fresh it.

When a user clicked a node in the view, a window pops up with more information on the node, as generally illustrated in FIG. 22 (2200).

A user may manage the network in any one of the following ways:

Reconnect one node to another by simply "draw" a line between the 2 desired nodes. For example, in FIG. 23 (2300), node "Meg's computer" is now connected to "Basement TV" after disconnected from "Dryer" (compare with the configuration of FIG. 22 (2200)).
Restart a node by clicking the restart button (see the pop-up window depicted in FIG. 22 (2200)).
Configure the properties of node (see the pop-up window depicted in FIG. 22 (2200)).

Preferred Embodiment System Summary

The present invention preferred exemplary system embodiment anticipates a wide variety of variations in the basic theme of construction, but can be generalized as a network integration system comprising:
  (a) smart gateway power controller (SGPC);
  (b) network gateway router (NGR); and
  (c) home automation network (HAN);
  wherein
  the SGPC interfaces the NGR with the HAN;
  the NGR connects to an external computer network;
  the SGPC is configured to transfer data from/to the HAN to/from the external computer network through the NGR using the network protocols of the external computer network; and
  the network protocols of the external computer network are different than the communication protocols used by the HAN.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a network integration method, the method operating in conjunction with a network integration system comprising:
  (a) smart gateway power controller (SGPC);
  (b) network gateway router (NGR); and
  (c) home automation network (HAN);
  wherein
  the SGPC interfaces the NGR with the HAN;
  the NGR connects to an external computer network;
  the SGPC is configured to transfer data from/to the HAN to/from the external computer network through the NGR using the network protocols of the external computer network; and
  the network protocols of the external computer network are different than the communication protocols used by the HAN;
  wherein the method comprises the steps of:
  (1) searching for an AP for connection/reconnection with the SGPC;
  (2) exchanging network configuration messages from the SGPC to another SGPC within the HAN;
  (3) exchanging runtime/maintenance HA messages between the SGPC and the another SGPC; and
  (4) proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
  An embodiment wherein the external computer network comprises the Internet.
  An embodiment wherein the network protocols of the external computer network comprise HTTP web access protocols.
  An embodiment wherein the SGPC resides within a subnet of the HAN.
  An embodiment wherein the data transfer comprises content/context delivery from the external computer network to the SGPC.
  An embodiment wherein the data transfer comprises web banner advertising delivery from the external computer network to the SGPC.
  An embodiment wherein the data transfer comprises status/control updates from/to the SGPC directed to/from a computing device connected to the external computer network.
  An embodiment wherein the data transfer comprises runtime information status updates from the SGPC to a computing device connected to the external computer network.
  An embodiment wherein the data transfer comprises energy consumption statistics from the SGPC directed to a computing device connected to the external computer network.
  An embodiment wherein the SGPC is configured to transfer data to/from another SGPC connected to the HAN.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

Conclusion

A network integration system/method allowing computer network functionality in a coordinated/concerted fashion in network configurations that are local to and/or spanning network gateway routers has been disclosed. The system utilizes a Smart Gateway Power Controller (SGPC) to interact within a home automation network (HAN) to permit the local HAN to operate as a distinct network but still permit access to/from remote networks such as the Internet. The system permits inter-networking of HAN devices (including SGPCs) and device interaction as a group with consumers within a man-machine "social network," where information is pushed/pulled just as with a conventional social network. The system/method allows HAN device setup/action/monitoring wherein HAN devices host a number of user interfaces supported locally and externally to web interfaces/networks, these interfaces supporting local/remote access devices including mobile phones, tablet computers, laptops, desktop computers, and the like.

What is claimed is:

1. A network integration method, said method operating in conjunction with a network integration system, said system comprising:
(a) smart gateway power controller (SGPC);
(b) network gateway router (NGR); and
(c) home automation network (HAN);
wherein
said SGPC interfaces said NGR with said HAN;
said SGPC is configured to provide a user interface web page for direct access to data stored in said SGPC;
said SGPC is configured to communicate with a home-bound content (HBC) server comprising content for an integrated web banner (IWB) to be displayed to a user on said user interface web page, wherein said content is derived from a switch status and energy consumption of consumer devices connected to said SGPC;
said SGPC is configured to permit web access to said IWB through said NGR;
said SGPC is configured to permit access to status information on home automation devices monitored by said SGPC via said user interface web page;
said SGPC is configured to permit activation or deactivation of home automation devices controlled by said SGPC via said user interface web page;
said NGR connects to an external computer network (ECN);
said ECN is configured to exchange data using ECN network protocols;
said HAN is configured to exchange data using a HAN communication protocol;
said SGPC is configured to transfer data between said HAN and said ECN through said NGR using said network protocols of said ECN; and
said network protocols of said ECN are different than said HAN communication protocol;
wherein said method comprises the steps of:
(1) searching for an access point (AP) for connection or reconnection with said SGPC;
(2) exchanging network configuration messages from said SGPC to another SGPC within said HAN;
(3) exchanging runtime or maintenance home automation (HA) messages between said SGPC and said another SGPC; and
(4) proceeding to said step (1).

2. The network integration method of claim 1 wherein said ECN comprises Internet.

3. The network integration method of claim 1 wherein said SGPC is further configured to communicate with said HBC to request data comprising the content for said IWB to be displayed to a user on said user interface web page.

4. The network integration method of claim 1 wherein said SGPC resides within a subnet of said HAN.

5. The network integration method of claim 1 wherein said SGPC is further configured to alter a status or usage of a home automation device monitored by said SGPC in response to HA messages received from said another SGPC.

6. The network integration method of claim 1 wherein said data transfer comprises runtime information status updates from said SGPC to a computing device connected to said HAN.

7. The network integration method of claim 1 wherein said data transfer comprises status or control updates between said SGPC and a computing device connected to said ECN.

8. The network integration method of claim 1 wherein said data transfer comprises runtime information status updates from said SGPC to a computing device connected to said ECN.

9. The network integration method of claim 1 wherein said data transfer comprises energy consumption statistics from said SGPC directed to a computing device connected to said ECN.

10. The network integration method of claim 1 wherein said SGPC is configured to transfer data to or from said another SGPC connected to said HAN.

11. A tangible non-transitory computer usable medium having computer-readable program code means comprising a network integration method wherein said method controls a network integration system comprising:
(a) smart gateway power controller (SGPC);
(b) network gateway router (NGR); and
(c) home automation network (HAN);
wherein
said SGPC interfaces said NGR with said HAN;
said SGPC is configured to provide a user interface web page for direct access to data stored in said SGPC;
said SGPC is configured to communicate with a home-bound content (HBC) server comprising content for an integrated web banner (IWB) to be displayed to a user on said user interface web page, wherein said content is derived from a switch status and energy consumption of consumer devices connected to said SGPC;
said SGPC is configured to permit web access to said IWB through said NGR;
said SGPC is configured to permit access to status information on home automation devices monitored by said SGPC via said user interface web page;
said SGPC is configured to permit activation or deactivation of home automation devices controlled by said SGPC via said user interface web page;
said NGR connects to an external computer network (ECN);
said ECN is configured to exchange data using ECN network protocols;
said HAN is configured to exchange data using a HAN communication protocol;
said SGPC is configured to transfer data between said HAN and said ECN through said NGR using said network protocols of said ECN; and
said network protocols of said ECN are different than said HAN communication protocol;
wherein said method comprises the steps of:
(1) searching for an access point (AP) for connection or reconnection with said SGPC;
(2) exchanging network configuration messages from said SGPC to another SGPC within said HAN;
(3) exchanging runtime or maintenance home automation (HA) messages between said SGPC and said another SGPC; and
(4) proceeding to said step (1).

12. The computer usable medium of claim 11 wherein said ECN comprises Internet.

13. The computer usable medium of claim 11 wherein said SGPC is further configured to communicate with said HBC to request data comprising the content for said IWB to be displayed to a user on said user interface web page.

14. The computer usable medium of claim 11 wherein said SGPC resides within a subnet of said HAN.

15. The computer usable medium of claim 11 wherein said SGPC is further configured to alter a status or usage of a home automation device monitored by said SGPC in response to HA messages received from said another SGPC.

16. The computer usable medium of claim 11 wherein said data transfer comprises runtime information status updates from said SGPC to a computing device connected to said HAN.

17. The computer usable medium of claim 11 wherein said data transfer comprises status or control updates between said SGPC and a computing device connected to said ECN.

18. The computer usable medium of claim 11 wherein said data transfer comprises runtime information status updates from said SGPC to a computing device connected to said ECN.

19. The computer usable medium of claim 11 wherein said data transfer comprises energy consumption statistics from said SGPC directed to a computing device connected to said ECN.

20. The computer usable medium of claim 11 wherein said SGPC is configured to transfer data to or from said another SGPC connected to said HAN.

\* \* \* \* \*